United States Patent [19]

Shimizu et al.

[11] Patent Number: 4,745,490

[45] Date of Patent: May 17, 1988

[54] IMAGE RECORDING APPARATUS WITH MULTIPLE IMAGE RECORDING MEANS

[75] Inventors: Katsuichi Shimizu, Kunitachi; Koichi Miyamoto, Yokohama, both of Japan

[73] Assignee: Canon Kabushiki Kaisha, Tokyo, Japan

[21] Appl. No.: 935,132

[22] Filed: Nov. 26, 1986

Related U.S. Application Data

[63] Continuation of Ser. No. 876,295, Jun. 18, 1986, abandoned, which is a continuation of Ser. No. 643,173, Aug. 22, 1984, abandoned.

[30] Foreign Application Priority Data

Aug. 26, 1983 [JP] Japan ................. 58-155008
Aug. 29, 1983 [JP] Japan ................. 58-156413

[51] Int. Cl.$^4$ ............................................. G03G 15/00
[52] U.S. Cl. ................................... 358/300; 346/160; 355/24
[58] Field of Search .............. 358/296, 300-302, 358/75, 78, 264, 265; 346/108, 157, 160, 74.7; 355/3 SH, 4, 23, 24, 14 SH; 271/65, 186

[56] References Cited

U.S. PATENT DOCUMENTS

| | | | |
|---|---|---|---|
| 4,035,073 | 7/1977 | Del Vecchio | 355/8 X |
| 4,315,684 | 2/1982 | Sugiura et al. | 355/77 X |
| 4,338,020 | 7/1982 | Yukawa et al. | 355/3 SH X |
| 4,475,128 | 10/1984 | Koumura | 358/296 |
| 4,476,486 | 10/1984 | Ayata et al. | 358/75 |
| 4,505,576 | 3/1985 | Sugiura et al. | 355/14 R |
| 4,521,805 | 6/1985 | Ayata et al. | 358/296 X |
| 4,564,864 | 1/1986 | Maeshima | 358/296 X |
| 4,579,446 | 4/1986 | Fujino et al. | 355/24 |
| 4,602,868 | 7/1986 | Tsubo | 355/77 |

FOREIGN PATENT DOCUMENTS

| | | | |
|---|---|---|---|
| 2413034 | 9/1975 | Fed. Rep. of Germany | 358/264 |
| 159549 | 9/1983 | Japan | 355/23 |

Primary Examiner—Clifford C. Shaw
Attorney, Agent, or Firm—Fitzpatrick, Cella, Harper & Scinto

[57] ABSTRACT

An image recording apparatus comprises first and second image recording units for respectively recording images on a recording medium. Each of the first and second recording units includes a generator for generating a horizontal synchronization signal. A transport unit transports the recording medium between the first and second recording units and first and second control units control the first and second recording units. Similarly, a third control unit controls the transport unit. A master control unit controls the first, second, and third control units according to the external inputs to the apparatus. More particularly, the master control unit includes a selector for selecting one of the horizontal synchronization signals generated by one of the generators included in the first and second recording units in response to an external input for selection of the recording units. The apparatus may also be constructed to record images of a pair of originals and to manipulate electronic image signals representing the images of the originals in accordance with either main or subsidiary scanning directions in which the originals are read.

24 Claims, 39 Drawing Sheets

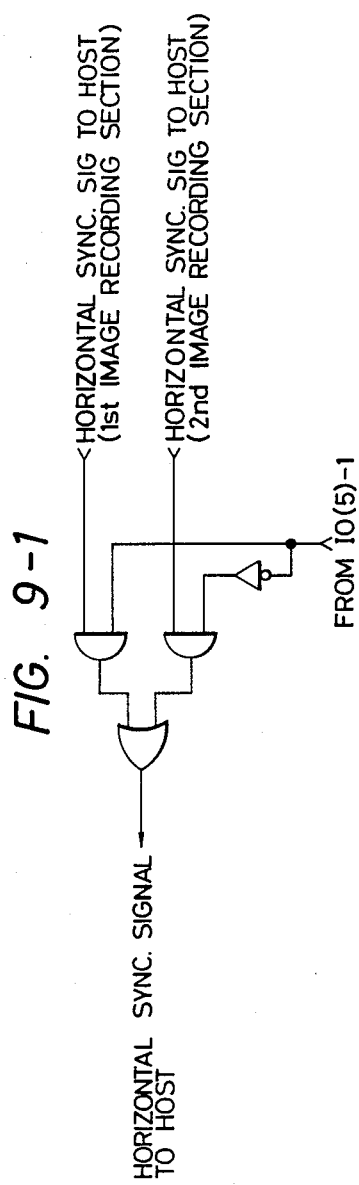
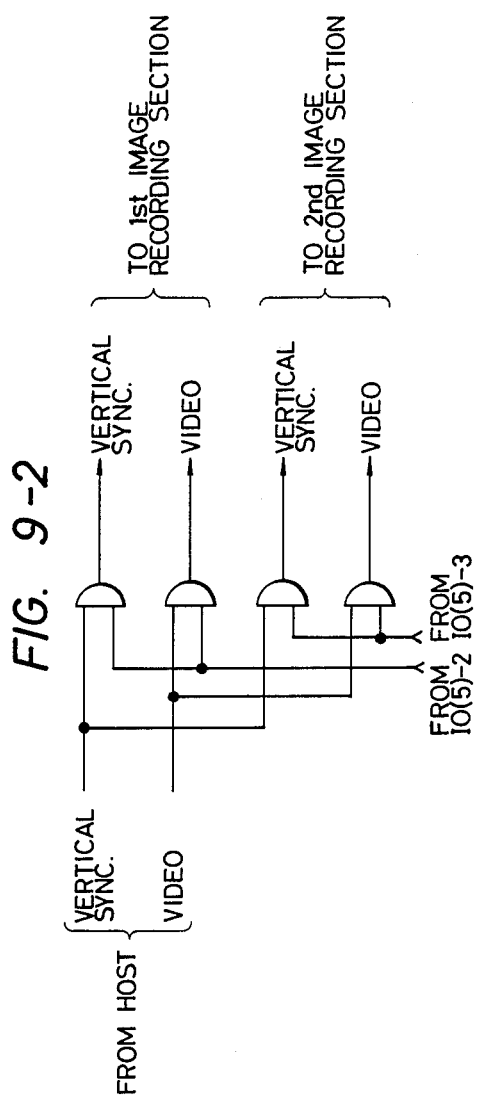
FIG. 9-1
FIG. 9-2

IMAGE RECORDING APPARATUS WITH MULTIPLE IMAGE RECORDING MEANS

This application is a continuation of application Ser. No. 876,295, filed June 18, 1986, now abandoned, which was a continuation of application Ser. No. 643,173, filed Aug. 22, 1984, now abandoned.

BACKGROUND OF THE INVENTION

1. Field of the Invention

The present invention relates to an image recording apparatus provided with plural image forming units.

2. Description of the Prior Art

There are already known various apparatus for recording an image on a paper sheet, such as a copier for reproducing the image of an original document onto a recording sheet by means of a photosensitive member, or printers for recording image information in the form of electric signals onto recording sheets, for example, impact printers (typefont or wire-dot printers) or non-impact printers (thermal, ink jet or laser beam printers).

In recent years higher performance is required for these image recording apparatus for achieving a higher efficiency in the office. Particularly there is required and is being achieved a higher output speed, namely an increase of the number of sheets to be processed per unit time.

However each process has its specific speed, and a higher speed involves various problems which require tremendous developmental efforts to overcome and which tend to require an economically unjustifiable complicated and large apparatus.

In the example of a copier, only one copy can be obtained from a scanning of the original, as a latent image is formed on the photosensitive member by focusing the original image thereon, then transformed into a visible image and transferred onto the recording sheet. Consequently a higher speed can be achieved by only a higher machine speed, which gives rise to insufficient sensitivity of the photosensitive member and vibration, noise and reduced service life of the mechanical parts. On the other hand, if the lamp for illuminating the original is used at a higher light intensity, the heat generated by the lamp will raise the temperature of the apparatus. In this manner there will appear numerous problems that are difficult to resolve in a complete manner, and the number of such problems increase logarithmically with the increase of the speed. Consequently an upper limit speed is defined in consideration of the balance with the advantages obtained by the higher speed.

On the other hand, there exists a demand for recording information on both sides of the recording sheet, as in the ordinary printing, for the purpose of saving resources and filing space. In order to meet such demand there is already proposed a method of stacking the recording sheets after information recording on the first sides thereof, and feeding said sheets again for information recording on the second sides thereof. This method is acceptable in case of producing plural copies, each having the same recording, but is quite inefficient in case of two-sided copies each having different recording. More specifically, in case of copying different pages 1, 2, 3, 4, . . . , there is required to at first record the odd pages 1, 3, 5, . . . on the sheets and then to feed said sheets again to record the even pages 2, 4, 6, . . . on the opposite sides thereof. However, if there occurs a trouble in said re-feeding of the sheets such as sheet jamming or simultaneous feeding of two sheets, the entire recording operation has to be repeated anew since the combination of the record on the first and second sides of a sheet becomes different. Such error can be avoided by information recording in succession on the first and second sides of each sheet, but such procedure will be extremely inefficient because of the cumbersome operation required for the sheet feeding.

As a part of the higher performance recording, there exists a demand for recording two information on a side of the recording sheet. Particularly in response to the recent popularity of colored information in various fields, there is required, in contrast to the conventional black records, to add a red record for example for the title of a document for greater legibility. Such mixed-color recording is possible in the conventional printer utilizing ink ribbon, but has not been realized in the electrostatic copier or laser beam printer for ordinary office use because the apparatus inevitably becomes quite bulky. A simpler method to achieve this objective with the conventional apparatus consists of at first recording the information with black color and then recording another information with red color on the same side by replacing the image developing unit in the apparatus for black color with another unit for red color, but such method is practically unacceptable because of its cumbersomeness.

SUMMARY OF THE INVENTION

An object of the present invention is to avoid the above-described drawbacks of the conventional technology.

More specifically an object of the present invention is to provide an image recording apparatus capable of various recording modes through the use of plural recording units.

Another object of the present invention is to provide an image recording apparatus capable of a high-speed recording mode, a two-side recording mode and a multi-recording mode.

Still another object of the present invention is to provide a control device capable of effectively controlling the above-mentioned image recording apparatus in various recording modes.

Still another object of the present invention is to achieve a higher performance in the high-speed, multiplex and two-side copying in a structure quite different from the conventional copier, through the use of an image recording apparatus composed of a first image recording unit, a second image recording unit and a sheet handling unit, and an original reading apparatus capable of discriminating the status of the original.

The foregoing and still other objects of the present invention will become fully apparent from the following description to be taken in conjunction with the attached drawings.

BRIEF DESCRIPTION OF THE DRAWINGS

FIGS. 9-1 and 9-2 are circuit diagrams of a switching circuit 8-1 therein;

FIGS. 10-1, 10-2 and 10-3 are flow charts showing the control programs for said master controller;

FIGS. 12-1, 12-1A, 12-1B and 12-2 are flow charts showing the control program for said first image controller;

FIGS. 14-1A, 14-1B, and 14-2 are flow charts showing the control program for said second image controller;

FIGS. 16-1 and 16-2 are flow charts showing the control program for said sheet handling controller;

DETAILED DESCRIPTION OF THE PREFERRED EMBODIMENTS

Now the present invention will be explained in detail with reference to an embodiment shown in the attached drawings.

Figure 1:
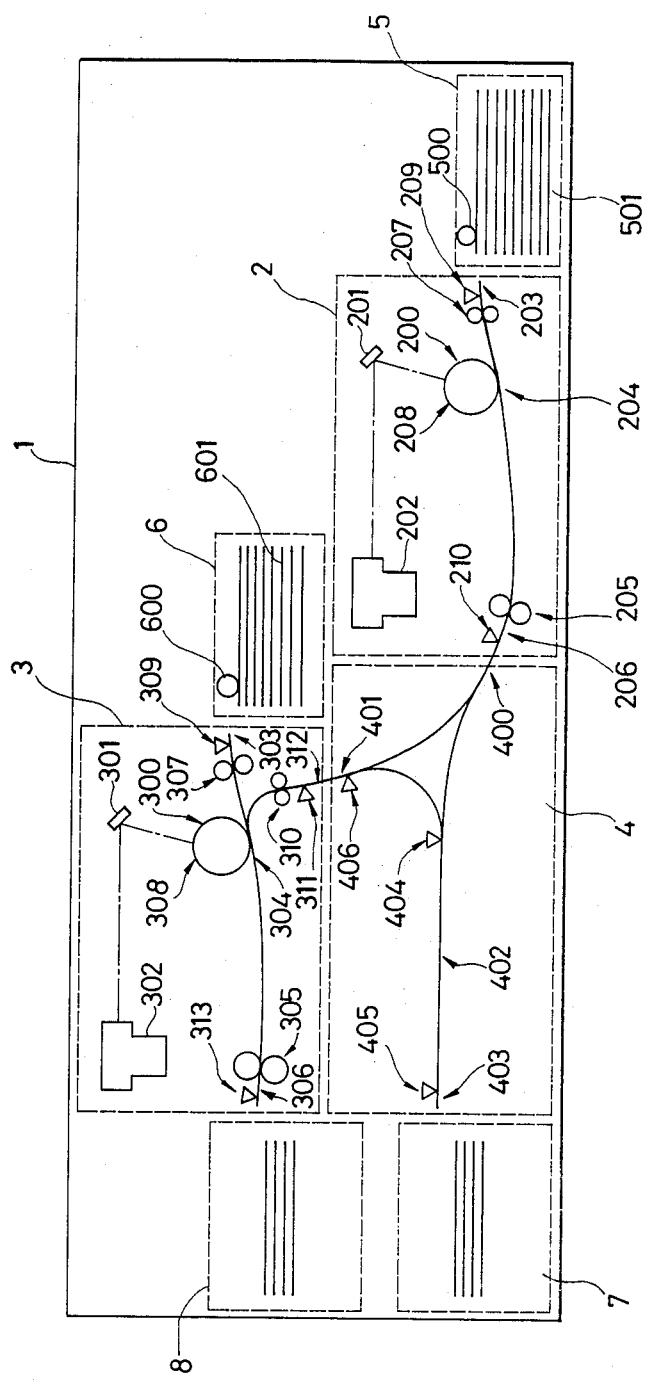
FIG. 1 is a schematic view of an image recording apparatus embodying the present invention.

FIG. 1 shows the basic structure of said embodiment with an emphasis on the transportation of the recording sheets, wherein shown are a main body 1; a first image recording unit 2; a second image recording unit 3; a sheet handling unit 4; a first sheet feeding unit 5; a second sheet feeding unit 6; a first stacker 7; and a second stacker 8.

The first and second image recording units 2, 3 are composed of laser beam printers of substantially the same structure. In the first image recording unit there is provided a rotary photosensitive member 200 around which positioned are electrophotographic process units (not shown) already known in the art. Said photosensitive member 200 is scanned, through a mirror 201 and a laser scanner 202, with a laser beam modulated according to the image signals to obtain a latent image which is rendered visible by a determined electrophotographic process. On the other hand, recording sheets 501 stacked in the first feed unit 5 are one by one supplied, through feed means 500 composed, for example, of known rollers, into a sheet feed path 203 of the first image recording unit 2. The sheet thus supplied reaches a transfer unit 204 in synchronism with the visible image on the photosensitive member 200, whereby the image is transferred onto said sheet by known transfer means.

Subsequently the sheet reaches a fixing unit 205 wherein the image on the sheet is fixed by known heating or pressure means, and is discharged from the first image recording unit 2 through a discharge path 206. Along said paths there are suitably provided transport means such as rollers and belts.

The second image recording unit 3 is different from the unit 2 in that a second sheet feed path 312 is provided for receiving the sheet from the sheet handling unit 4 in addition to a sheet feed path 303 for receiving the sheet 601 stacked in the second sheet feed unit 6. The sheets received from these sheet feed paths are both guided to a transfer unit 304.

Now there will be explained the sheet handling unit 4, which transmits the sheet received from a receiving path 400 connected to the discharge path 206, either to a sheet feed path 312 through a feed path 401 with or without inversion of the sheet, or to the first stacker 7 through a sheet inverting unit 402 and a sheet feed path 403.

Figure 2:
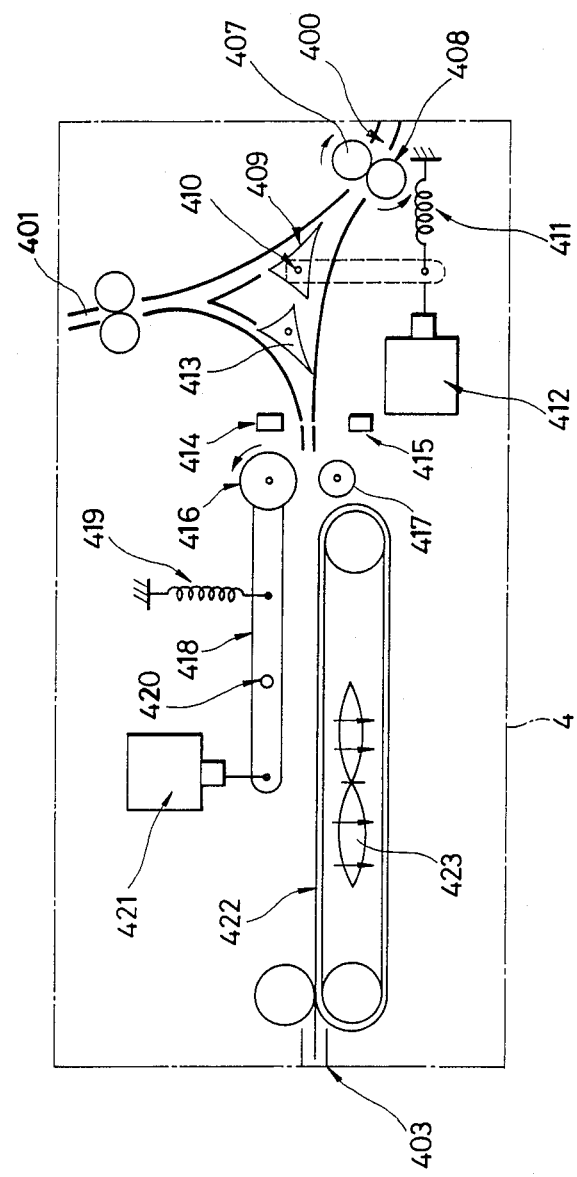
FIG. 2 is a schematic vew of the basic structure of the sheet handling unit in said image recording apparatus.

FIG. 2 shows the details of the sheet handling unit 4, wherein rollers 407, 408 in the sheet receiving path 400 are rotated in a direction of arrow, and at the downstream side thereof there is provided a path switching finger 409. Said finger 409 is rotatably supported about a shaft 410 and is biased counterclockwise by a spring 411 to form a sheet path toward the sheet inverting unit 402. Upon energization of a solenoid (1) 412, the path switching finger 409 is rotated clockwise against the bias of the spring 411 to switch the sheet path toward the feed path 401. At the entrance of the sheet inverting unit 402 there is provided a finger 413 lowered by the weight thereof, whereby the sheet advancing to the left from the receiving path 400 can pass under said finger 413 while the sheet returning to the right from the sheet inverting unit 402 is guided by the upper face of said finger 413 toward the feed path 401. Next to the finger 413 there is provided a sheet detector composed of a lamp 414 and a photoreceptor 415. There are also provided an inverting roller 416 and an idler roller 417. The inverting roller 416 is constantly driven counterclockwise and is mounted at an end of an arm 418 which is rotatable about a shaft 420. The arm 418 is suspended by a spring 419 to maintain a determined gap between the inverting roller 416 and the idler roller 417, but rotates clockwise upon energization of a solenoid (2) 421 to press the inverting roller 416 against the idler roller 417, which is rotatably supported and rotates clockwise upon contact with the inverting roller 416. Adjacent to said idler roller there is provided a clockwise rotating belt 422, for guiding the sheet toward the feed path 403 by suction with a fan 423 positioned under said belt.

The above-described sheet handling unit 4 functions in the following manner. In case of guiding the sheet from the receiving path 400 to the feed path 401 without inversion, the solenoid (1) 412 is energized to shift the switching finger 409, thus forming a path from the receiving path 400 to the feed path 401. On the other hand, in case of guiding the sheet to the feed path 401 after inversion, the solenoid (1) 412 is deactivated to guide the sheet to the inverting unit 402. As soon as the front end of the sheet passes between the inverting roller 416 and idler roller 417 and reaches the belt 422, the sheet is driven toward left by the suction force of the fan. Upon detection of the rear end of the sheet by the lamp 414 and the photoreceptor 415, the solenoid (2) 421 is energized to press the inverting roller 416 against the idler roller 417 to grip the sheet therebetween, whereupon the counterclockwise rotation of the inverting roller advances the sheet toward right against the frictional force with the belt 422 caused by the fan 423. Thus, the rear end in the first sheet now constitutes a new front end. Said new front end is guided by the finger 413 as explained in the foregoing and proceeds toward the feed path 401. In this mode, the top and bottom sides of the sheet are mutually exchanged or inverted in comparison with the case of direct feed to the feed path 401.

In case of guiding the sheet toward the feed path 403, the solenoid (1) 412 is deactivated to guide the sheet to the inverting unit 402, and the solenoid (2) 421 is maintained deactivated whereby the sheet is transported to the left by the cooperation of the belt 422 and the fan 423 toward the feed path 403.

The first and second stacker 7, 8 are used for successively stacking the sheets respectively discharged from the path 403 of the sheet handling unit 4 and from the discharge path 306 of the second image recording unit.

Now there will be explained the function of the above-described apparatus in the high-speed, two-side and multi-recording modes.

(I) High-speed recording mode

Figure 3:
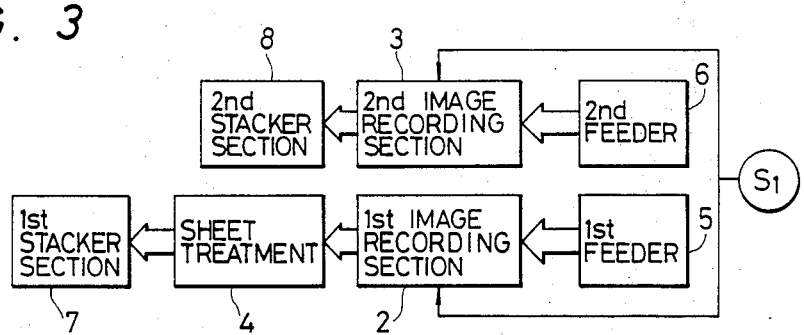
FIGS. 3, 4 and 5 are block diagrams showing the systems respectively in the high-speed, superposed and two-side copyings.

The high-speed recording in said apparatus is achieved, as shown in FIG. 3, by activating the first and second image recording units 2, 3 in parallel, by distributing the image signals S1 supplied to the apparatus to said recording units.

In said mode, the first image recording unit 2 records the image according to the signals S1 on the sheets supplied from the first sheet feed unit 5, and transfers said sheets to the sheet handling unit 4. Said unit 4 maintains the solenoids 412, 421 deactivated to discharge the received sheets to the first stacker 7 through the path 403. On the other hand, the second image recording unit 3 records the image according to the same signals S1 on one side of the sheets received from the second feed unit 6, and discharges said sheets to the second stacker 8 through the discharge path 306.

Thus, if each of the first and second image recording units 2, 3 has a processing capacity of N sheets per unit time, the entire apparatus can achieve a high-speed recording of 2N sheets per unit time.

(II) Two-side recording mode

Figure 4:
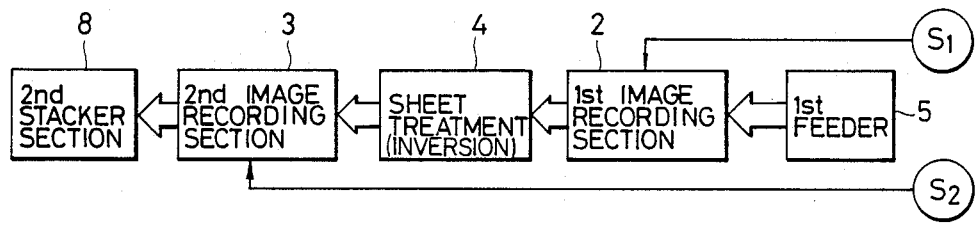

The two-side recording in the present appatatus is achieved, as shown in FIG. 4, by recording first image signals S2 on a first side of the sheets with the first image recording unit 2 and recording second image signals S3 on a second side of the sheet with the second image recording unit 3.

The first image recording unit 2 records the image according to the signals S1 on the first side (top face in the illustration) of the sheet fed from the first sheet feed unit 5, and transfers said sheet to the sheet handling unit 4. Said unit 4 inverts the sheets in the aforementioned manner, by deactivating the solenoid (1)412 to advance the sheet to the inverting unit 402 and activating the solenoid (2)421 upon detection of the rear end of the sheet by the detector 414, 415 to transfer said sheet in reverse direction to the second image recording unit 3 through the feed path 401.

The transferred sheet receives the transfer of an image corresponding to the signals S2 in the transfer unit 304, onto the top face in the illustration, which is opposite to the face bearing the image transferred in the first image recording unit 2 because of the sheet inversion. The sheet bearing the image also on the second sheet is discharged to the second stacker 8 through the discharge path 306, thus completing the two-side recording. In this mode the second sheet feed unit 6 is not used.

(III) Multi-recording mode

Figure 5:
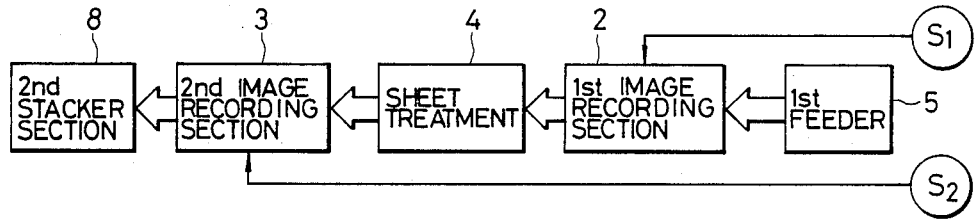

The multi-recording in the present apparatus is achieved, as shown in FIG. 5, by recording according to the image signals S1 with the first image recording unit 2 and recording according to the image signals S2 with the second image recording unit 3 on the same side of the sheets.

The first image recording unit 2 records a first image according to the image signals S1 on a side (top face in the illustration) of the sheets supplied from the first sheet feed unit 5 and transfers said sheet to the sheet handling unit 4. Said unit 4 energizes the solenoid (1) 412 to directly transfer the sheets from the feed path 401 to the second image recording unit 3. In the transfer unit 304, the sheet receives the transfer of an image corresponding to the image signals S2 and having a color different from that of the first image. Said image transfer takes place on a side (top face in the illustration) bearing the image transferred in the first image recording unit 2.

After the recording of the second image, the sheet is discharged to the second stacker 8 through the discharge path 306, thus completing the multirecording.

Figure 6:
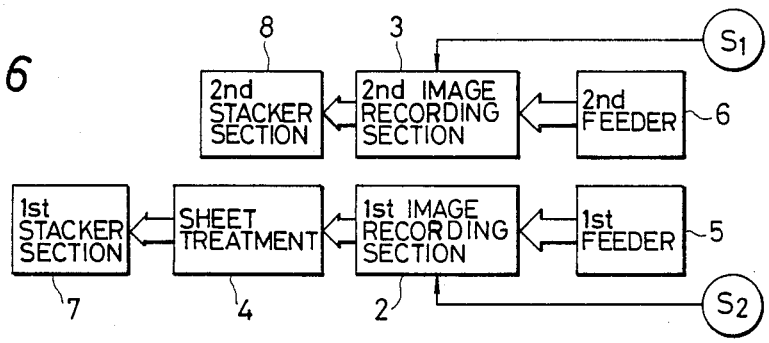
FIG. 6 is a block diagram showing the system for mutually independent copying of different images.

In addition to the improved performance, the recording apparatus of the present embodiment is capable of achieving a function of two independent apparatus. More specifically, the image recording units 2, 3 may be operated independently by image signals S1, S2 of mutually unrelated contents and timings as shown in FIG. 6.

In such case the first image recording unit 2 records the images according to the signals S1 on a side of the sheets fed from the first sheet feed unit 5, and transfers said sheets to the sheet handling unit 4. Said unit 4 deactivates the solenoids 412, 421 to discharge the received sheets to the first stacker 7 through the path 403. On the other hand, the second image recording unit 3 records the images according to the signal S2 on a side of the sheets supplied from the second sheet feed unit 6, and discharges said sheets to the second stacker 8 through the discharge path 306. In such mode, the present recording apparatus can achieve a function corresponding to two apparatus of a same processing capacity per unit time.

Figure 7:
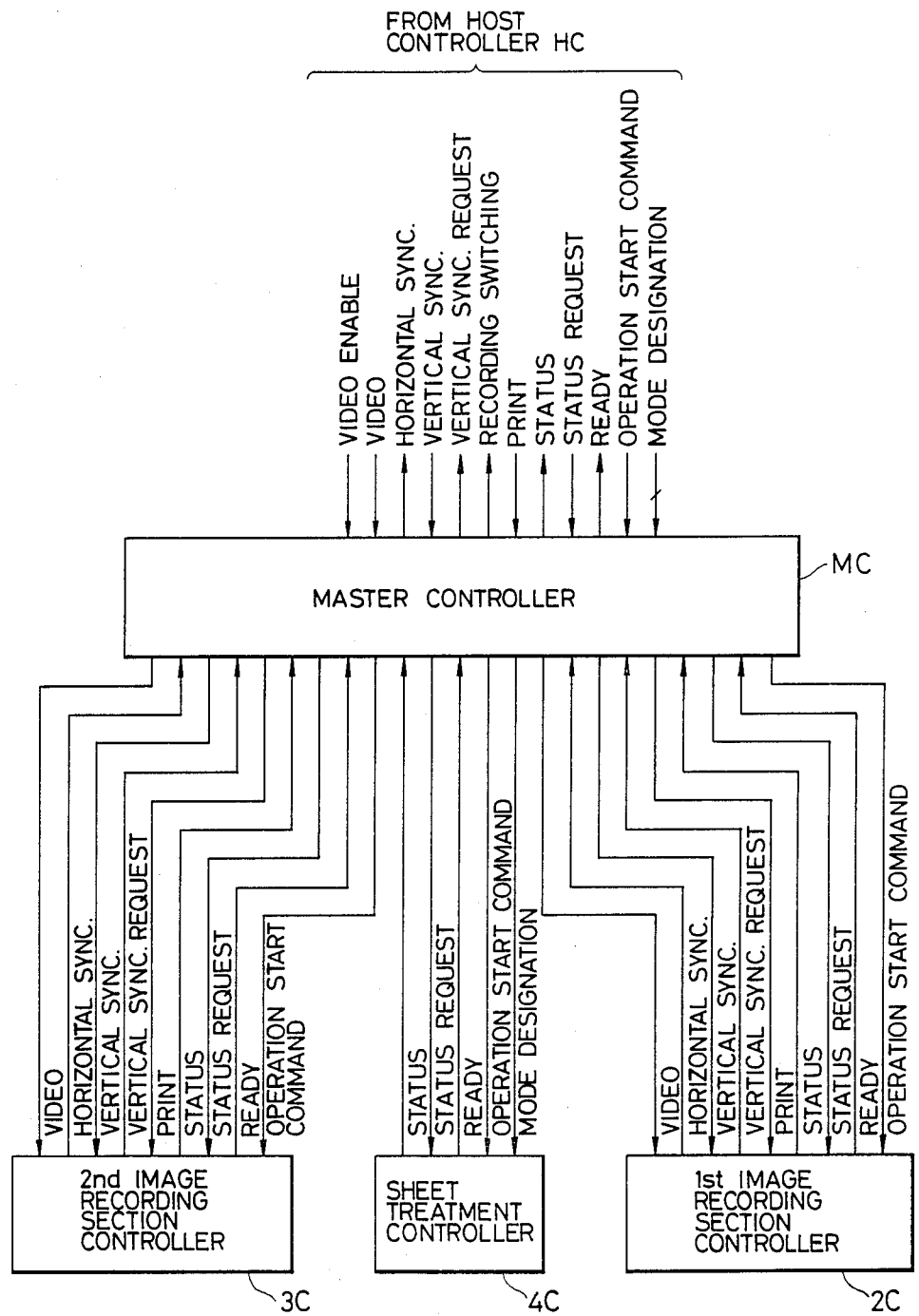
FIG. 7 is a block diagram of a control circuit for use in the image recording apparatus of the present invention.

FIG. 7 is a block diagram of a control circuit for the image recording apparatus 1, said control circuit being composed of independent controllers 2C, 4C, 3C respectively for the first image recording unit, sheet handling unit and second image recording unit and a master controller MC for controlling said controllers. Consequently the master controller MC is provided with interfaces for connection with a host controller HC for controlling the image reading apparatus for releasing the image signals, with said first and second image recording controllers 2C, 3C and with said sheet handling controller 4C.

Figure 8:
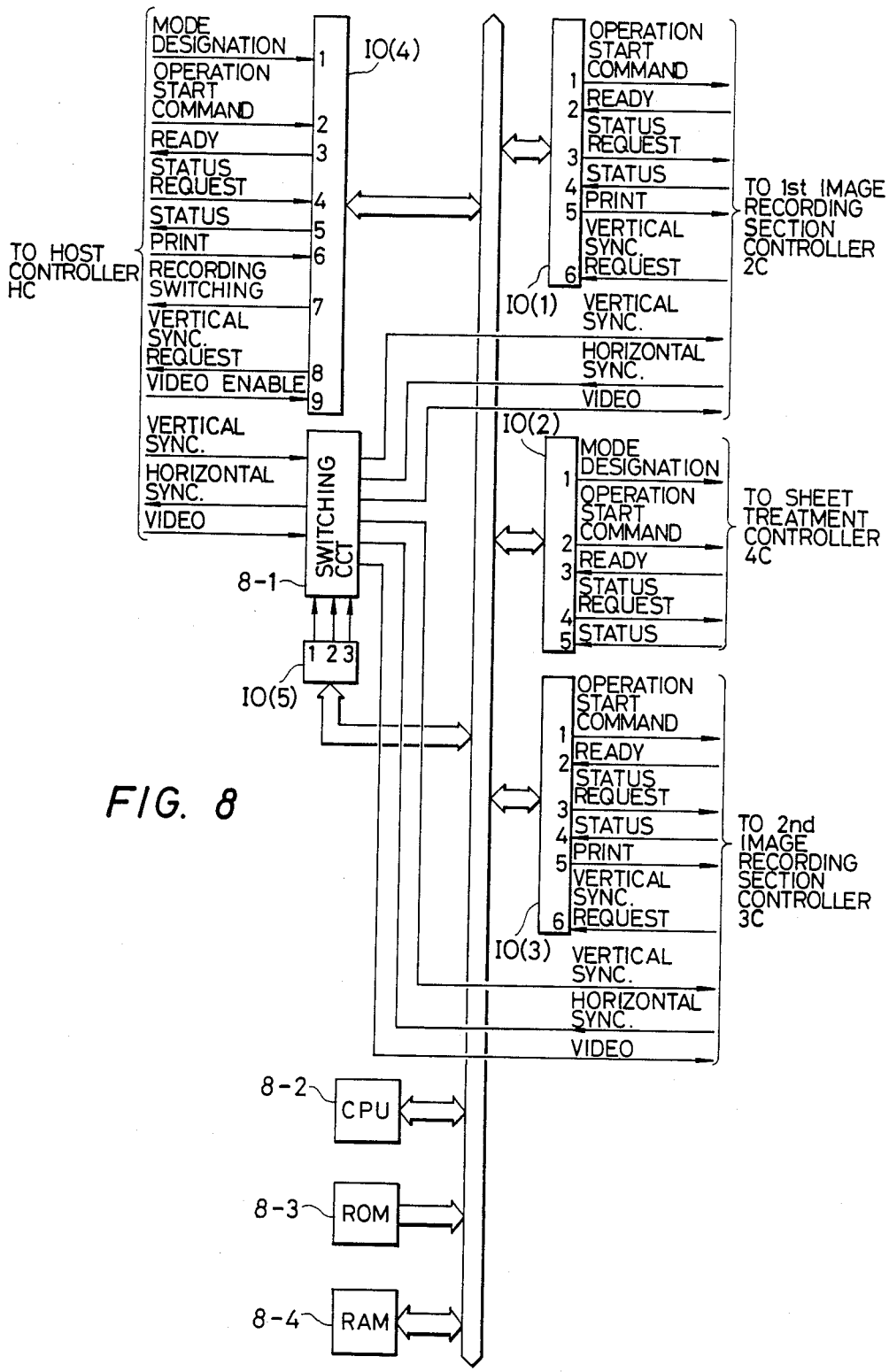
FIG. 8 is block diagram of a master controller for use in said control circuit.
Figure 8:
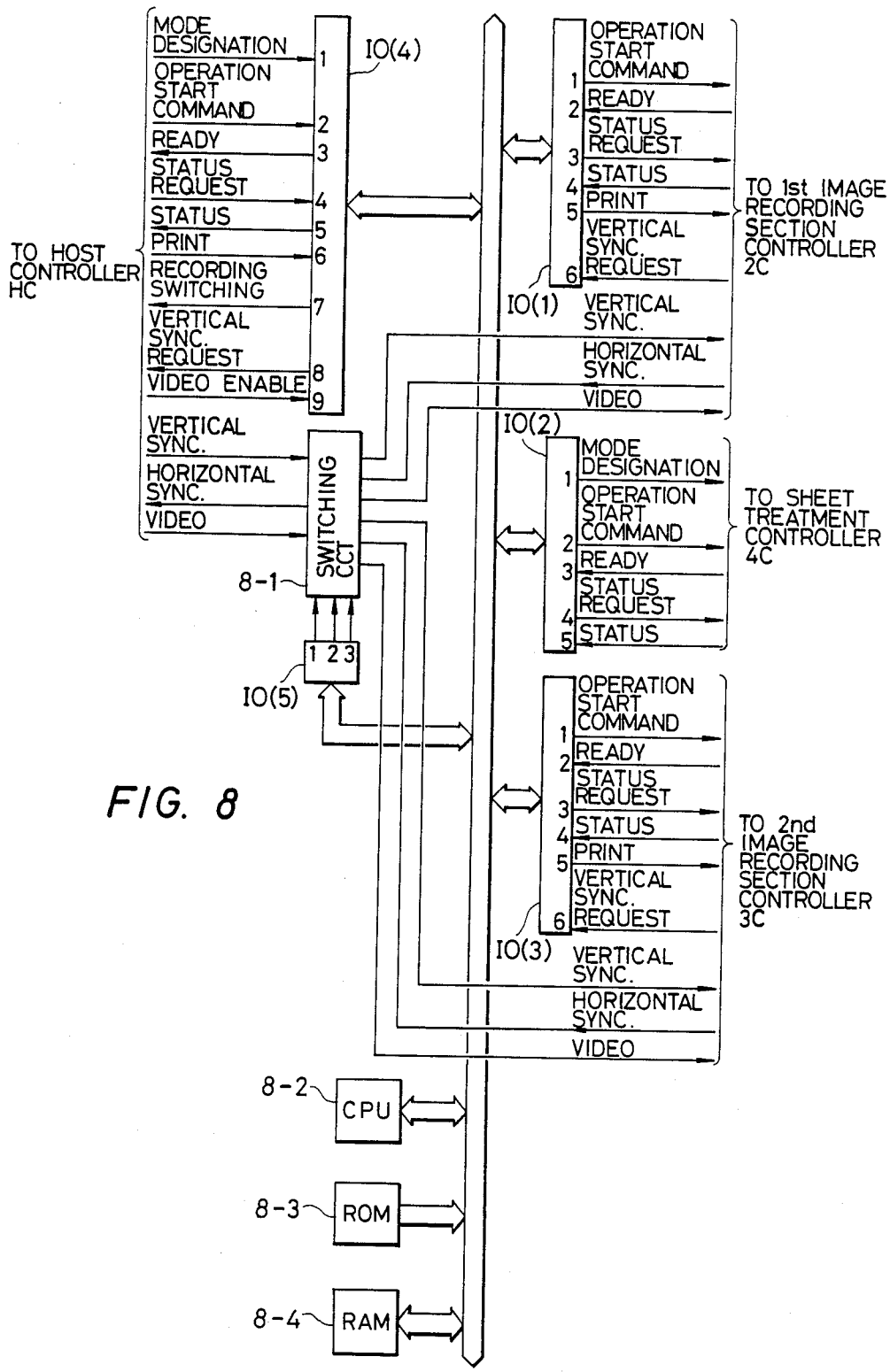
Figures 2, 10:
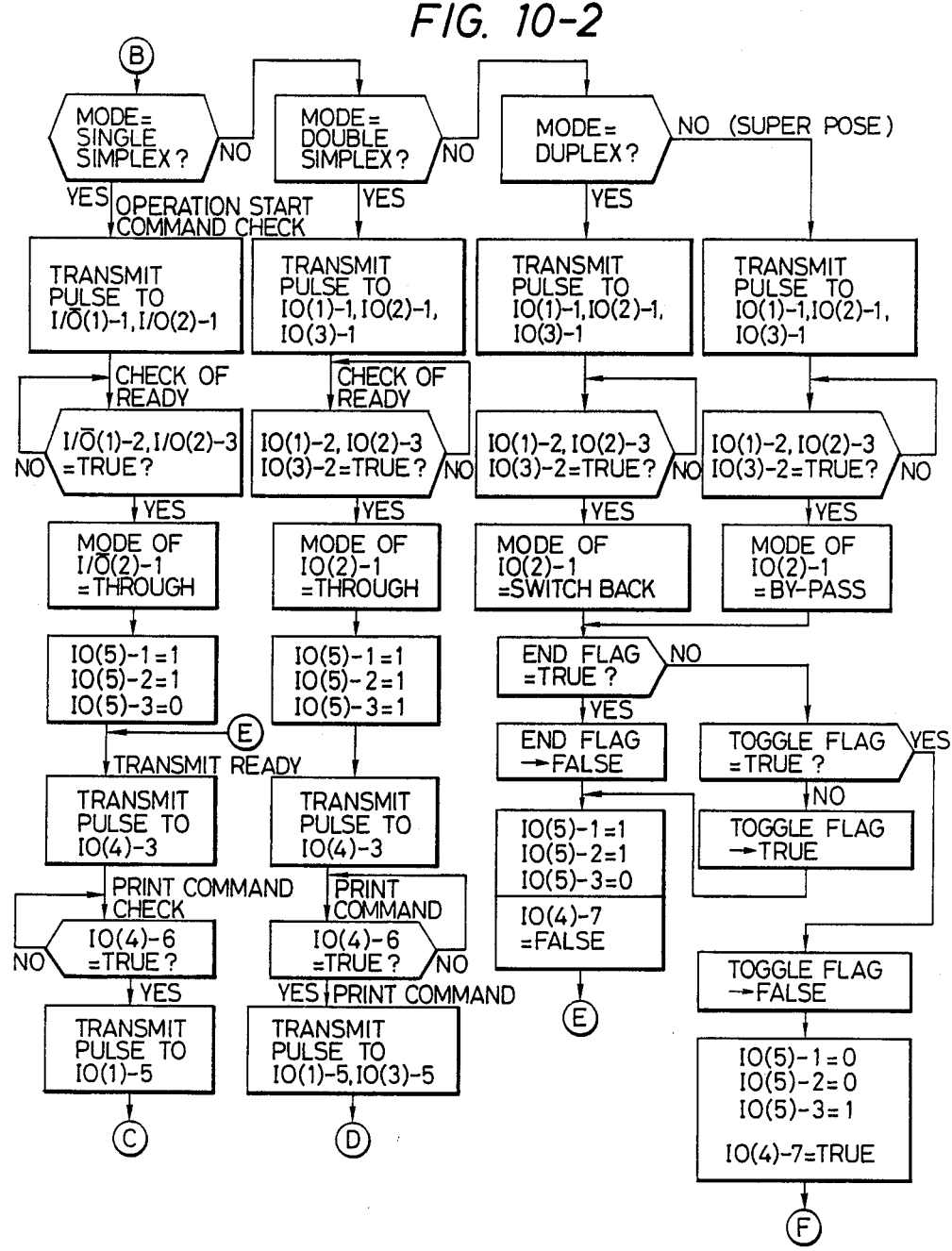
Figures 3, 10:
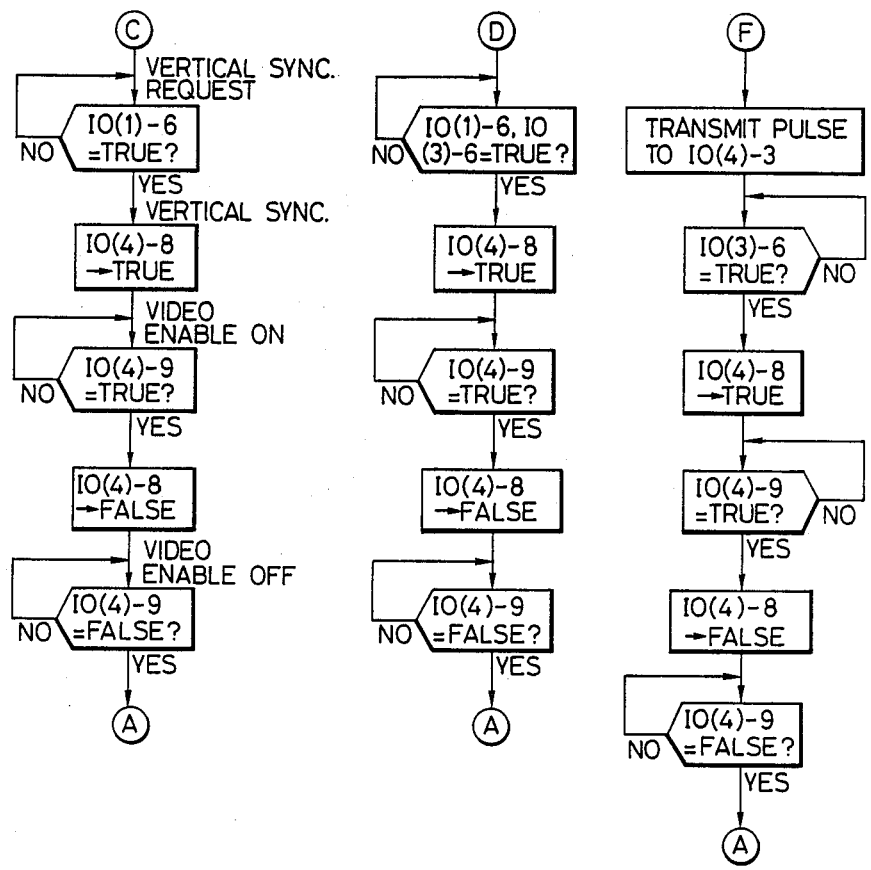

FIG. 8 is a block diagram of the master controller MC. In the interface with the host controller a signal supplied to the port 1 of an I/O port (4) (hereinafter represented as IO(4)-1) is used for designating one of four modes, i.e. a DOUBLE SIMPLEX MODE in which the two image recording units 2, 3 of the recording apparatus are activated simultaneously to increase the recording speed of a same image; a DUPLEX MODE in which the sheet after recording in the first image recording unit 2 is inverted for recording on the opposite side of the sheet in the second image recording unit 3 and a SUPERPOSE MODE in which the sheet after recording in the first image recording unit 2 is passed by in the sheet handling unit 4 to the second image recording unit 3 for the addition of an image therein to the already recorded image. A port IO(4)-4 receives a request signal for knowing the status of the image reading apparatus, in response to which the master controller MC releases status information to the host controller HC through a port IO(4)-5. More specifically, in response to said request signal, the master controller MC requests status information of other three controllers through ports IO(1)-3, 4; IO(2)-4, 5; and IO(3)-3, 4 and transmits said status information in united form to the host controller HC through the port IO(4)-5. Said status information includes information on the presence and position of sheet jamming in the aforementioned three units, on the number of recorded pages, on the presence and size of recording sheets in the first and second image recording units, on the presence of developing agent, on whether the lasers are operated in satisfactory condition, whether the scanners are operated at the desired revolution and whether the photosensitive members are rotated at the desired speed. In response to the status information being satisfactory for image recording, the host controller HC supplies a start command to a port IO(4)-2, whereby the master controller MC selects a part or all of ports IO(1)-1, IO(2)-2 and IO(3)-1 according to the aforementioned mode designation and supplies a start command to the corresponding controllers. In response to said start command, the first and second image recording units 2, 3 activate the photosensitive drum, chargers, developing units etc. and return ready signals to port IO(1)-2, IO(3)-2 when they become ready for image recording. Also the sheet handling unit 4 immediately sends a ready signal to a port IO(2)-3 unless a sheet jamming is present. In response to said ready signals, the master controller MC sends a ready signal from a port IO(4)-3 to the host controller HC, which, in response to said ready signal, supplies a print command to a port IO(4)-6. In response thereto the master controller MC sends a print command to the corresponding units through ports IO(1)-5, IO(3)-5. In response thereto, the image recording units 2, 3 start sheet feeding, stop registration rollers 207, 308 (FIG. 1) and sends vertical synchronization request signals to ports IO(1)-6, IO(3)-6 when the sheets reach the registration rollers. As said registration rollers are so positioned that the distance therefrom to the image transfer unit (204 or 304 in FIG. 1) is equal to the distance form the image recording position (208 or 308 in FIG. 1) to said image recording position, the sheet is stopped at said registration rollers until the arrival of the vertical synchronization signal. The vertical synchronization request signals received from the corresponding recording units are transmitted by the master controller through a port IO(4)-8 to the host controller, which then generates the vertical synchronization signal at a suitable timing and simultaneously starts the sending of video signals in synchronism with a horizontal synchronization signal supplied from the master controller. In response to said vertical synchronization signal, the registration rollers of the corresponding recording unit are activated again to advance the stopped recording sheet. Simultanously the image recording is started, whereby the recording sheet is aligned with the image to be transferred at the image transfer unit.

During the transmission of the video signal, the host controller releases a video enable signal to a port IO(4)-9 of the master controller MC, which thus indentifies the completion of recording at the end of said enable signal. A record switching signal released from a port IO(4) -7 is used, in the DUPLEX MODE or SUPERPOSE MODE, for requesting, to the host controller HC, the information to be recorded on the bottom face or to be superposed. Since the sheet is supplied from the sheet handling unit to the second image recording unit in response to said signal, the host controller HC need not to transmit the aforementioned print command to the port IO(4)-6. Consequently the host controller HC needs only to await the return of the vertical synchronization signal from a port IO(4)-8.

FIGS. 9-1 and 9-2 show the details of the switching circuit 8-1 shown in FIG. 8, wherein a FIG. 9-1 shows a switching circuit for the horizontal synchronization signals generated in the first and second image recording units 2, 3.

As already explained before, there is provided only one video signal supply system although two recording units are provided. Consequently recording of two different image signals cannot be conducted at the same time by two recording units, though they may be utilized for simultaneous recording of the same image signal. Thus a horizontal synchronization signal from a recording unit in recording operation should be selected and supplied to the host controller, and said selection is conducted by a port IO(5)-1 in FIG. 8. FIG. 9-2 shows a switching circuit for supplying the vertical synchronization signal and the video signal from the host controller to either or both of the first and second image recording units 2, 3. The supply to both takes place in case the signals of the ports IO(5)-2, 3 are active, while the supply to the first image recording unit 2 takes place when the signal of the port IO(5)- 2 alone is active, and the supply to the second image recording unit 3 takes place when the signal of the port IO(5)-3 alone is active. The above-described control is achieved by a central processing unit (CPU) 8-2 shown in FIG. 8 and composed for example, of a microprocessor 8085, according to a control program shown in FIGS. 10-1, 10-2, and 10-3 and stored in a read-only memory (ROM) 8-3 shown in FIG. 8. A random access memory (RAM) 8-4 shown in FIG. 8 is utilized for temporary storage of information relating to control such as status information.

Figure 11:
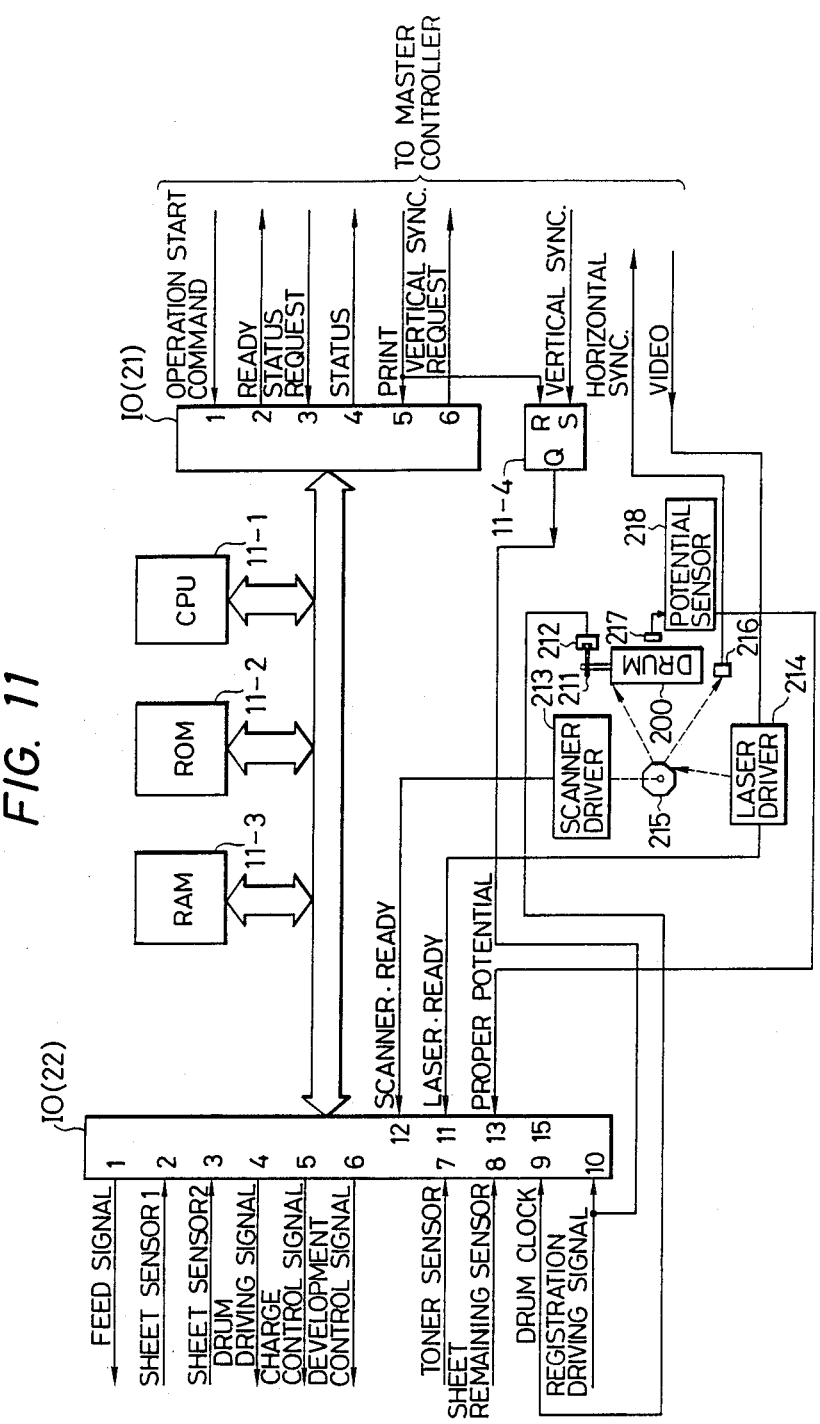
FIG. 11 is a block diagram of a controller for a first image recording unit.

FIG. 11 is a block diagram of the first image recording controller 2C, wherein a port IO(22)-1 releases a signal for driving the sheet feed roller 500 shown in FIG. 1, while a port IO(22)-2 receives a signal from a sheet sensor (1)209 shown in FIG. 1, and a port IO(22)-3 receives a signal from a sheet sensor 210 shown in FIG. 1. Ports IO(22)-4, 5, 6 release control signals for forming the latent image on the photosensitive member 200 shown in FIG. 1 and developing said latent image. A port IO(22)-7 receives a toner sensor signal from a sensor in the developing unit for indicating the presence or absence of the toner. A port IO(22)-8 receives a remaining sheet sensor signal indicating the remaining amount of the sheets in the feed unit 5 (FIG. 1), and a port IO(22)-9 receives drum clock signals which are generated in response to the drum rotation by a rotary encoder composed of a disk 211 mounted on the drum shaft and a photocoupler 212 and which are used as the basis of the sequence control. A port IO(22)-10 receives a print signal generated a flip-flop F/F11-4. A port IO(22)-13 receives a proper potential signal indicating that the surface potential of the drum 200 is adequate for recording, while a port IO(22)-11 receives a laser ready signal indicating whether the intensity and wavelength of the laser is adequate for recording, and a port IO(22)-12 receives a scanner ready signal indicating whether the revolution of a polygonal scanner 215 has reached a desired value. A central processing unit 11-1 constantly monitors said remaining sheet sensor signal, scanner ready signal and laser ready signal and sends the status of said signals through a port IO(21)-4 in response to a status request signal from the master controller MC through a port IO(21)-3. In case of normal status, signals from ports IO(22)-4, 5, 6 are activated in response to the start command from a port IO(21)-1, then the proper potential signal supplied to the port IO(22)-13 is monitored, and a ready signal is released from a port IO(21)-2 when the potential reaches a proper value, Then, in response to a print signal supplied from the master controller to a port IO(21)-5, a sheet feed signal from a port IO(22)-1 is activated. Thus the sheet is transported toward the registration rollers or roller 207 (FIG. 1), which is stopped in response to the print signal supplied to the flip-flop F/F11-4. Said sheet activates a sheet sensor (1)209 (FIG. 1) in front of the registration roller, and, in response to said activation through the port IO(22)-2, the CPU11-1 activates a timer corresponding to a time required for the sheet to advance from the sheet sensor 209 to the registration roller plus an additional time α, and, upon expiration of said timer, sends the vertical synchronization request signal to the master controller through a port IO(21)-6, thus requesting the transmission of the vertical synchronization signal and the video signal. In response to the subsequent vertical synchronization signal, the output of the flip-flop F/F11-4 is activated to start the rotation of the registration roller whereby the sheet is again transported toward the transfer unit. The output signal of said flip-flop F/F11-4 is also supplied to a port IO(22)-10, whereby, after the transmission of the vertical synchronization request signal from the port IO(21)-6, a registration driving signal is monitored at a port IO(22)-10, and, upon confirmation that said signal is active, there is activated a timer corresponding to a time required for sheet movement from the registration roller to a sheet sensor (2)210 (FIG. 1) plus an additional time α, for detecting a delayed sheet jam. Then the status signal is confirmed again, and the start command and the status request signal from the master controller are monitored. In the presence of a start command there is repeated the above-described described sequence, and, in the presence of a status request signal the information confirmed up to this moment is sent to the master controller MC. In case the timer expires in the course of the above-described procedure, the status of the sheet sensor (2) 210 is monitored through the port IO(22)-3, and, if it is active, there is activated a timer for a period corresponding to the sheet movement from the sensor to the sheet discharge, thus detecting the stay sheet jam. The aforementioned timers for detecting the delayed and stay jams are composed of internal timer circuits in the CPU 11-1, operate independently from the main program and interrupt any procedure at the CPU 11-1 upon expiration, for checking the status of the sheet sensor (2) 210.

Figures 1, 1A, 12:
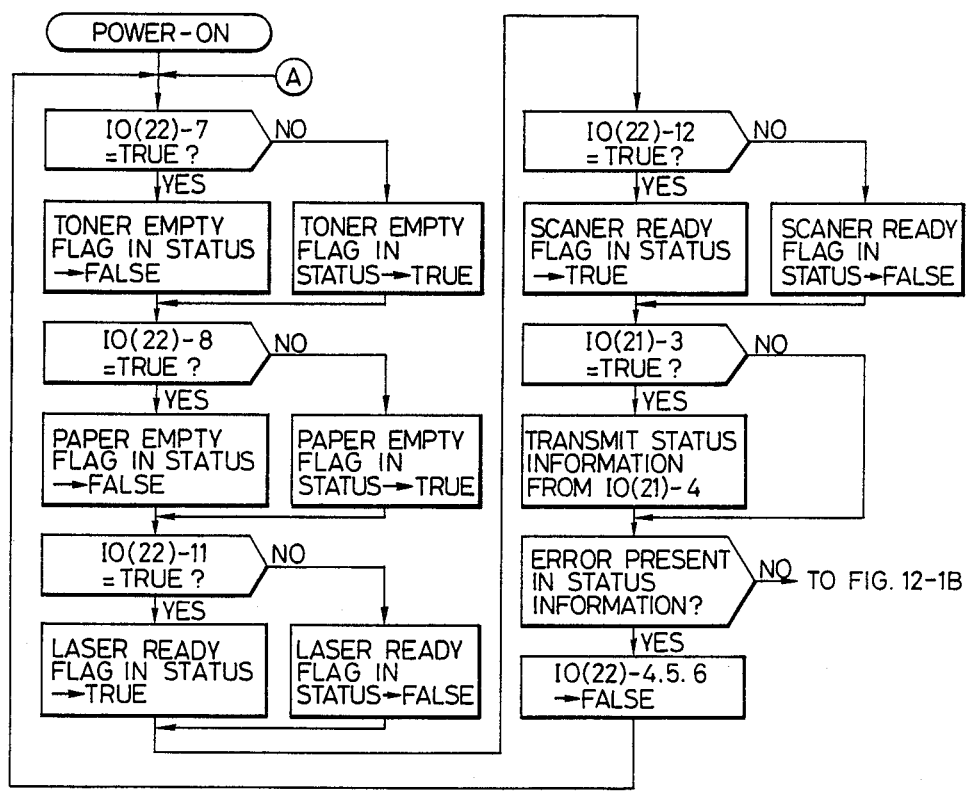
Figures 1B, 12:
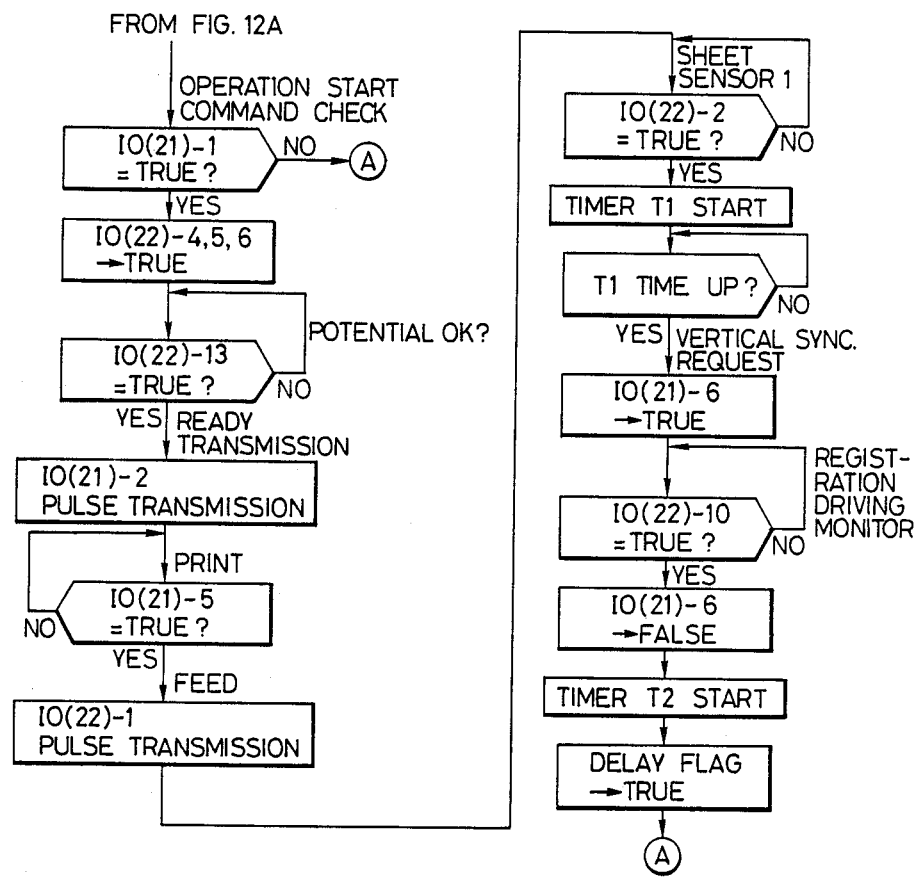
Figures 2, 12:
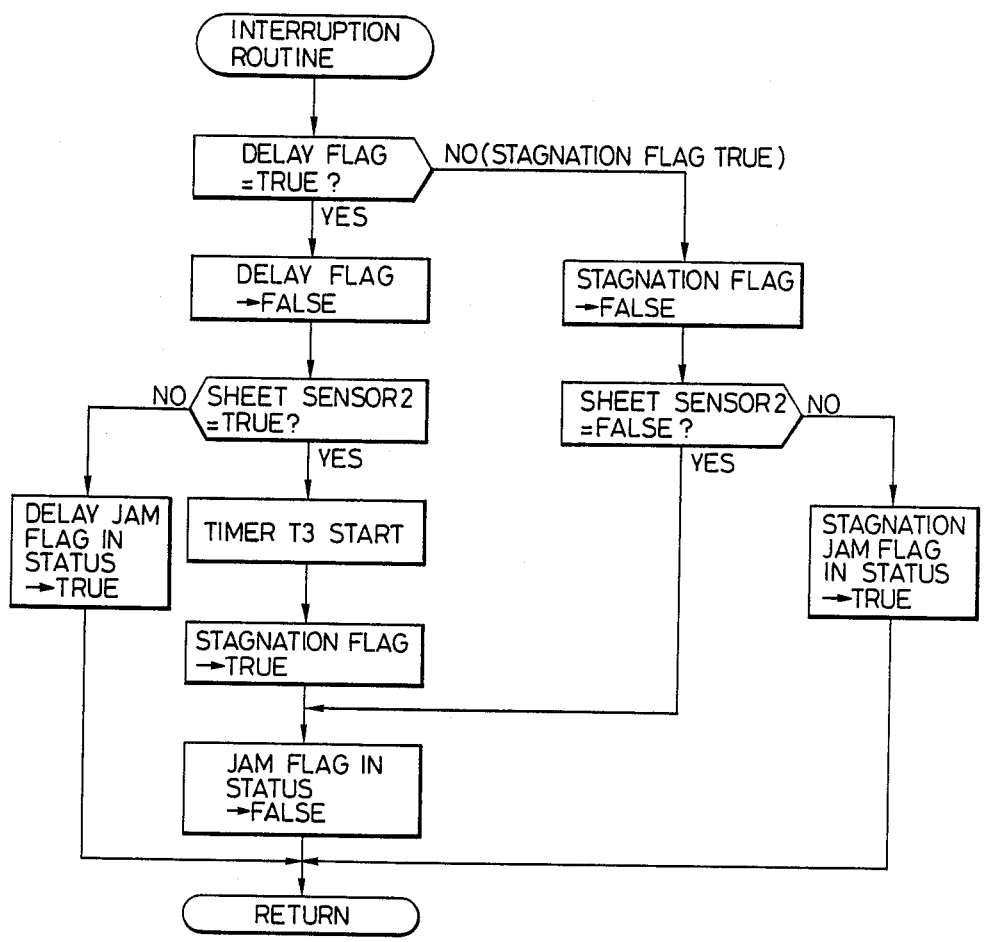

FIGS. 12-1, 12-2 show flow charts for the above-described control, and the corresponding program is stored in the ROM11-2. The RAM 11-3 is used for temporary storage of status information etc.

Figure 13:
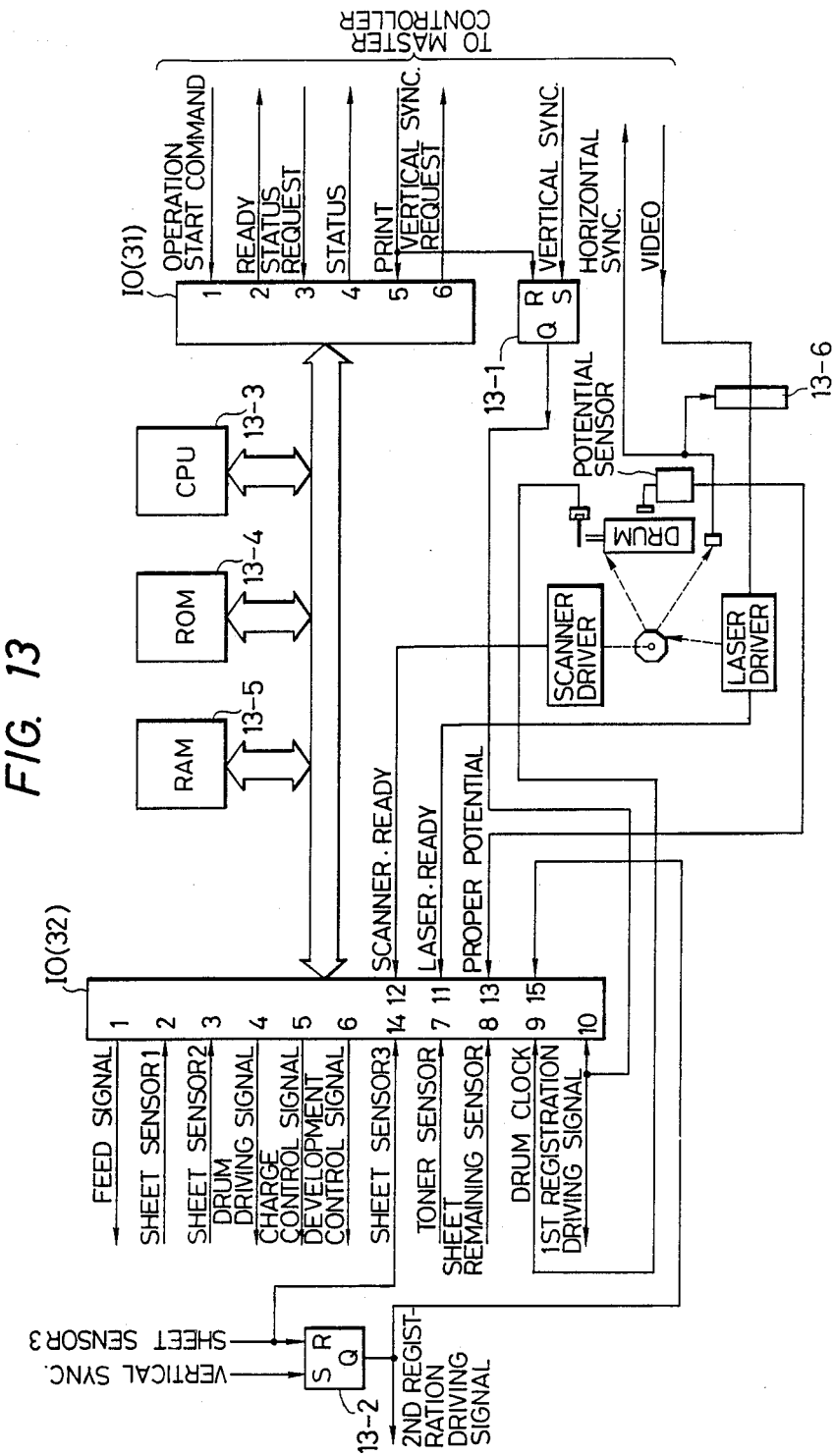
FIG. 13 is a block diagram of a controller for a second image recording unit.

FIG. 13 is a block diagram of the second image recording controller 3C, which is similar to the controller shown in FIG. 11 but is different, as is apparent from FIG. 1, since the second recording unit 3 includes the sheet feed path 312 from the sheet handling unit, and along said path, a second registration roller 310 and a third sheet sensor (3) 311. The detection signals therefrom are supplied respectively ports IO(32)-15 and IO(32)-14. The first and second registration rollers 307, 310 are respectively controlled by the flip-flops F/F13-1 and F/F13-2. The output signal of the F/F13-1 is deactivated or activated respectively in response to the print signal from the master controller MC and the vertical synchronization signal, while that of the F/F13-2 is deactivated or activated respectively in response to the active signal from the sheet sensor (3) 311 and the vertical synchronization signal. Consequently, the sequence control in this case is different from that of the first image recording controller 2C, in that a CPU13-3 monitors the print command from the master controller to a port IO(31)-5 and an active signal from the sheet sensor (3) to a port IO(32)-14 after the sending of the ready signal to a port IO(31)-2, and conducts the control according to a first detected one of said two monitored signals. Thus, if the print signal to the port IO(31)-5 is detected first, the control is same as that shown in FIG. 12 for the first image recording controller 2C. On the other hand, in case the signal of the sheet sensor (3) supplied to the port IO(32)-14 is detected first, there is activated a timer corresponding to a period of sheet movement from said sheet sensor (3) to the second registration roller plus an additional period α, and, after expiration thereof, the vertical synchronization signal is supplied to a port IO(31)-6, and subsequently confirmed is the active status of the second registration driving signal supplied to a port IO(32)-15. The procedure thereafter is omitted since it is similar to that for the first image recording controller shown in FIG. 12. The print signal is controlled by the host controller HC as the master controller MC controls the units according to the operation mode and judges whether the image signals should be sent either to the first image recording unit 2 or the second image recording unit 3, and the record switching signal is sent according to said judgement from the port IO(4)-7 shown in FIG. 8 to the host controller HC.

Figures 1A, 14:
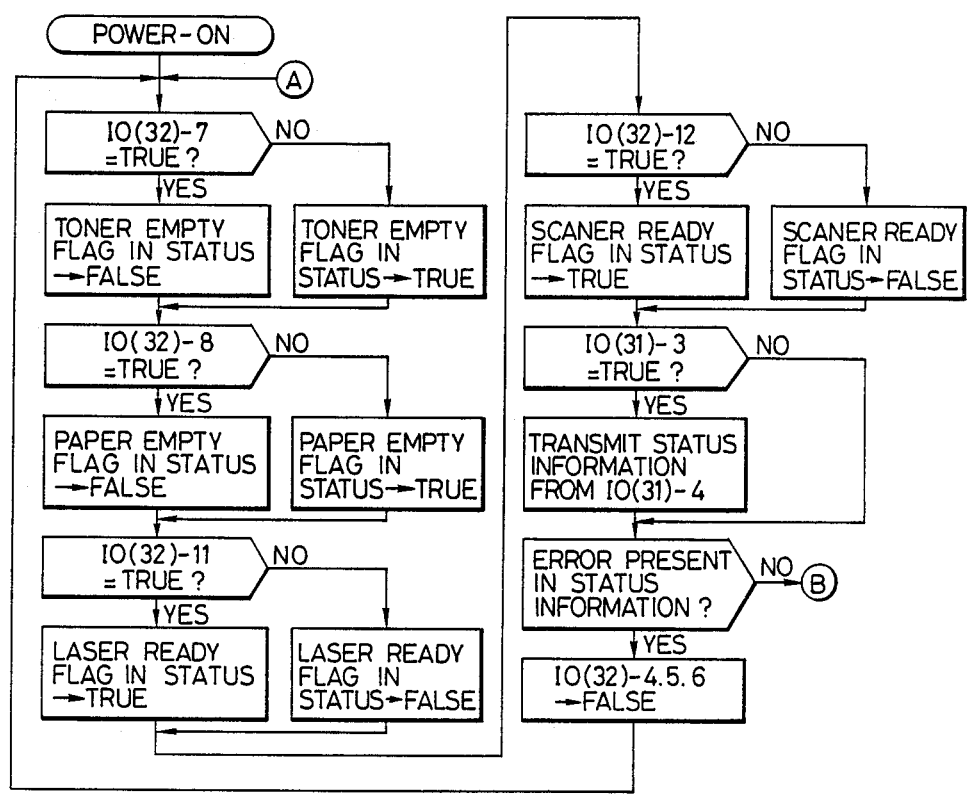
Figures 1B, 14:
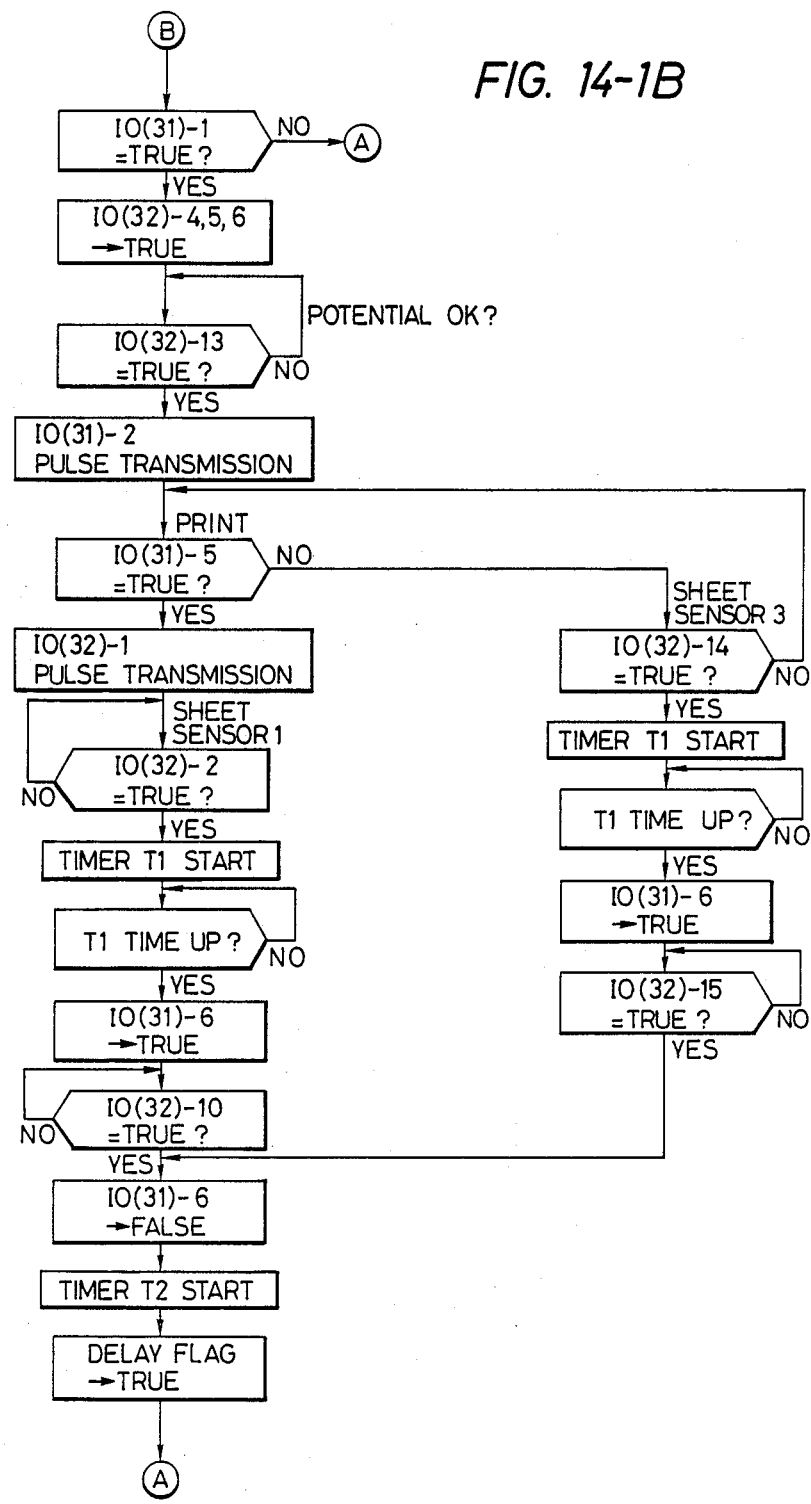
Figures 2, 14:
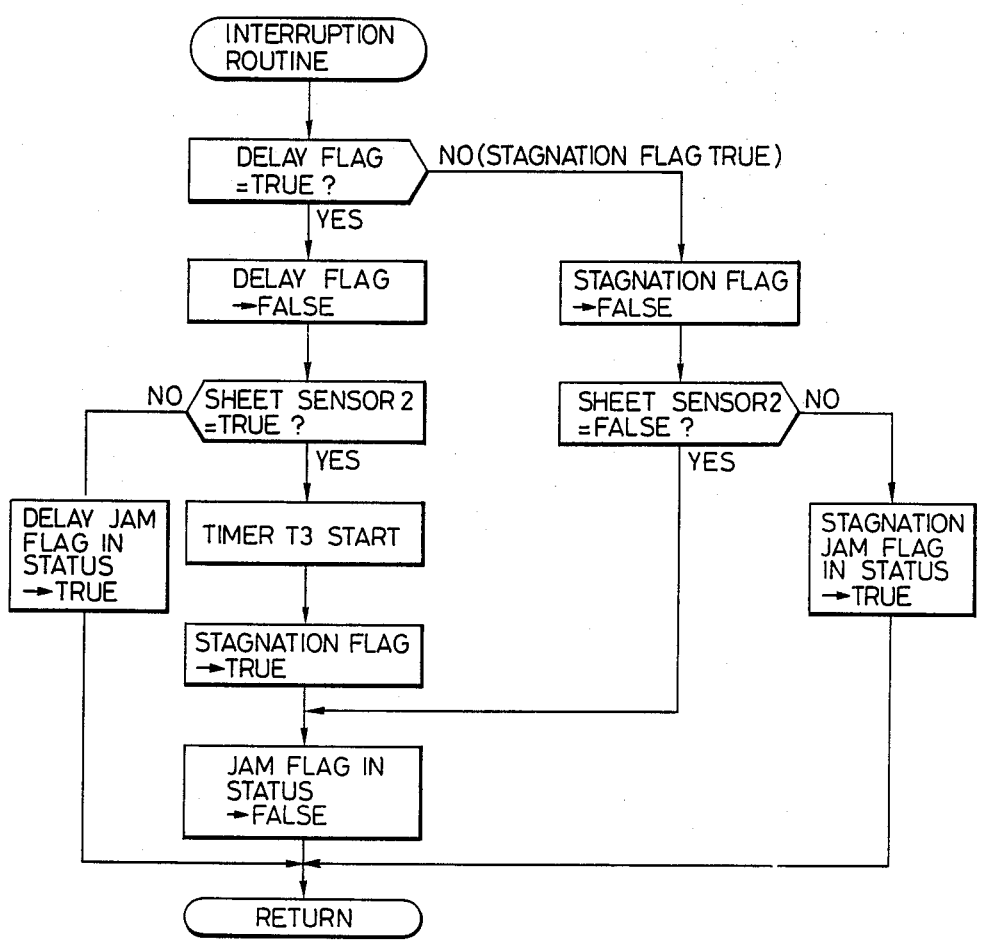

Reference is again made to the switching circuit shown in FIG. 9-1. In the SIMPLEX MODE the signal of the port IO(5)-1 is active to select the horizontal synchronization signal of the first image recording unit 2. It is to be noted that the first and second image recording units 2, 3 have the same scanner speed and the same drum rotating speed. Thus, in the DOUBLE SIMPLEX MODE, the same video signal is supplied to the scanners. The first and second scanners, though being rotated at a same speed, may not be mutually synchronized depending on the rotational position thereof. Thus the video signal, supplied in response to the horizontal synchronization signal of the first image recording unit 2, has to be re-synchronized for the recording in the second image recording unit 3. For this purpose there is provided a video signal buffer memory 13-6 of a capacity of several lines, into which the video signal is recorded in synchronism with the horizontal synchronization signal of the first image recording unit 2 and from which it is read in synchronism with the horizontal synchronization signal of the second image recording unit 3, thus achieving said re-synchronization. FIGS. 14-1 and 14-2 are flow charts of the above-described control program which is stored in a ROM 13-4.

Figure 15:
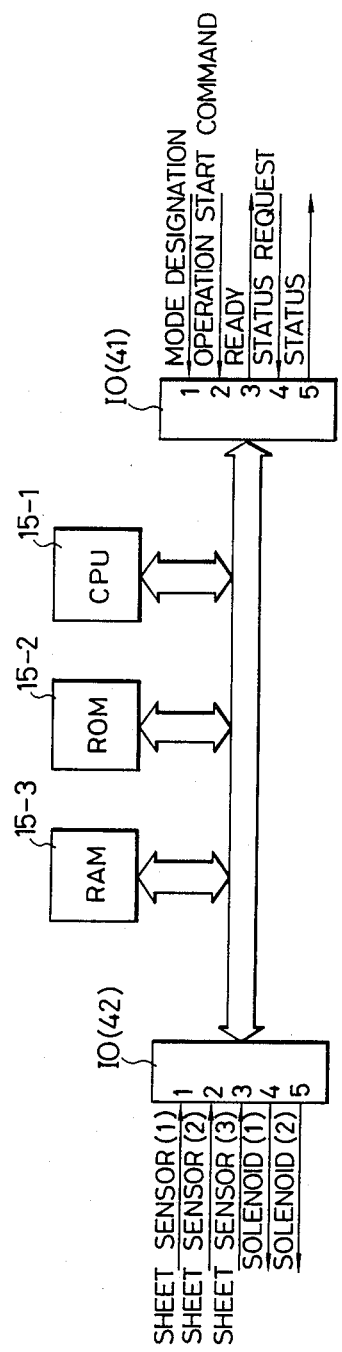
FIG. 15 is a block diagram of a controller for said sheet handling unit.

There is also provided a RAM 13-5 for temporary memory of the status information FIG. 15 is a block diagram of the sheet handling controller 4C, which designates the following modes in response to three modes of the image recording units to be provided from the master controller to the port IO(1)-1.

More specifically, in said unit, there are provided THROUGH MODE, SWITCH-BACK MODE and BYPASS MODE, respectively, corresponding to the SIMPLEX MODE, DUPLEX MODE AND SUPERPOSE MODE. Ports IO(42)-1, IO(42)-2, and IO(42)-3, respectively, receive signals of sheet sensors (1) 404, (2)405 and (3)406 shown in FIG. 1. Also ports IO(42)-4 and IO(42)-5, respectively, release signals to the solenoids (1) and (2) corresponding to 412 and 421 shown in FIG. 2. The solenoid (1) is deeenergized in the THROUGH or SWITCH-BACK MODE but is energized in the BYPASS MODE.

The sheet inverting function in the SWITCH-BACK MODE is achieved in the following manner.

At first there is monitored the signal of the sheet sensor (1) while it is at first activated and then is deactivated, and the solenoid (2) is energized simultaneously with said deactivation. Then monitored again is the signal of the sheet sensor (1) while it is again activated and is then deactivated, and the solenoid (2) is deactivated simultaneously with said deactivation.

In the THROUGH MODE, the sheet sensors (1) 404 and (2) 405 are used for detecting the delay jam and the stay jam in the feed path 403, while in the SWITCH-BACK MODE the sheet sensors (1) 404 and (3) 406 are used for detecting the delay jam and the stay jam in the feed path 401 shown in FIG. 2, and in the BYPASS MODE the sheet sensor (3) 406 is used for detecting the stay jam in said path 401. Status information can be released from a port IO(41)-5 to the master controller MC in response to a request therefrom.

Figures 1, 16:
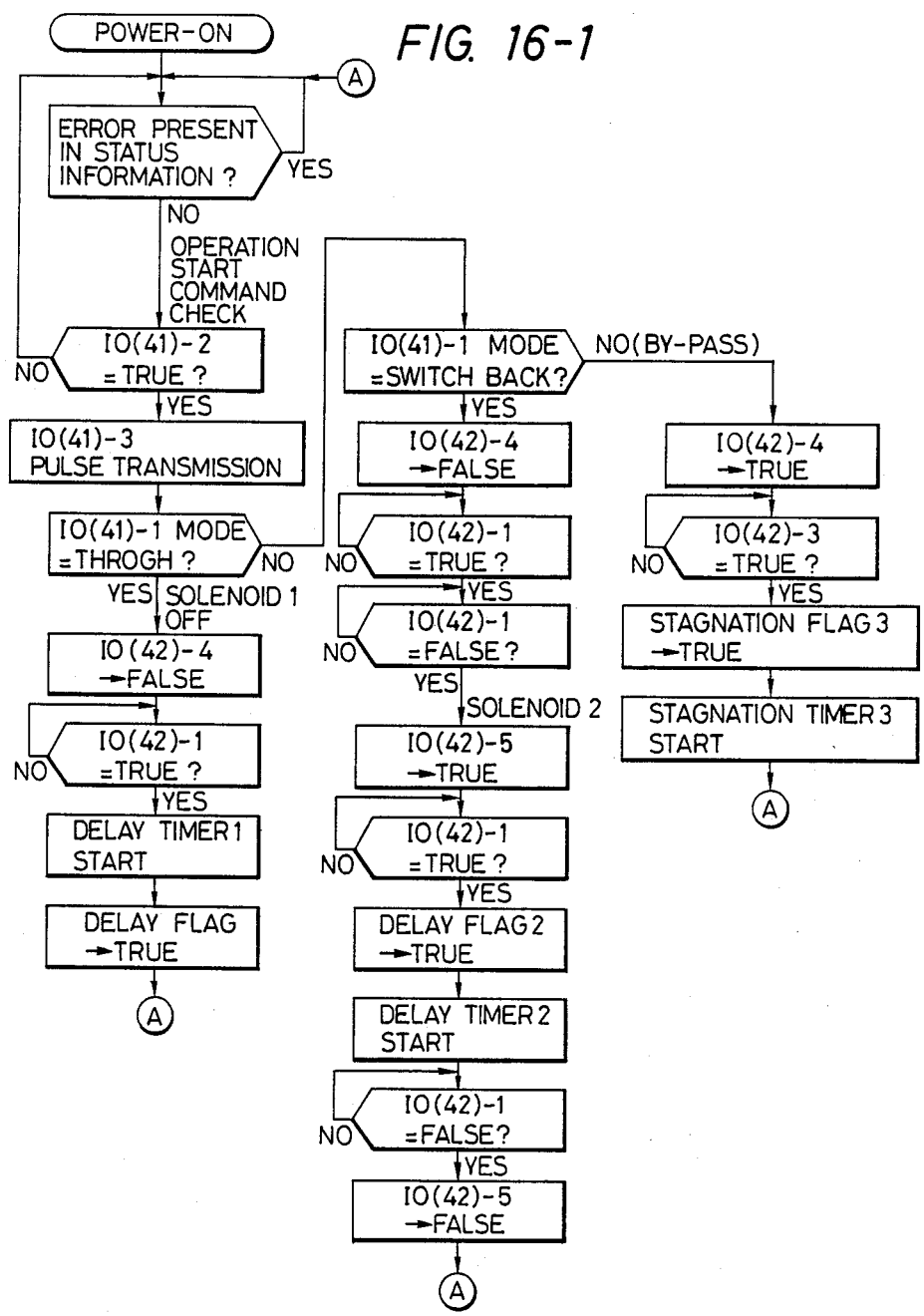
Figures 2, 16:
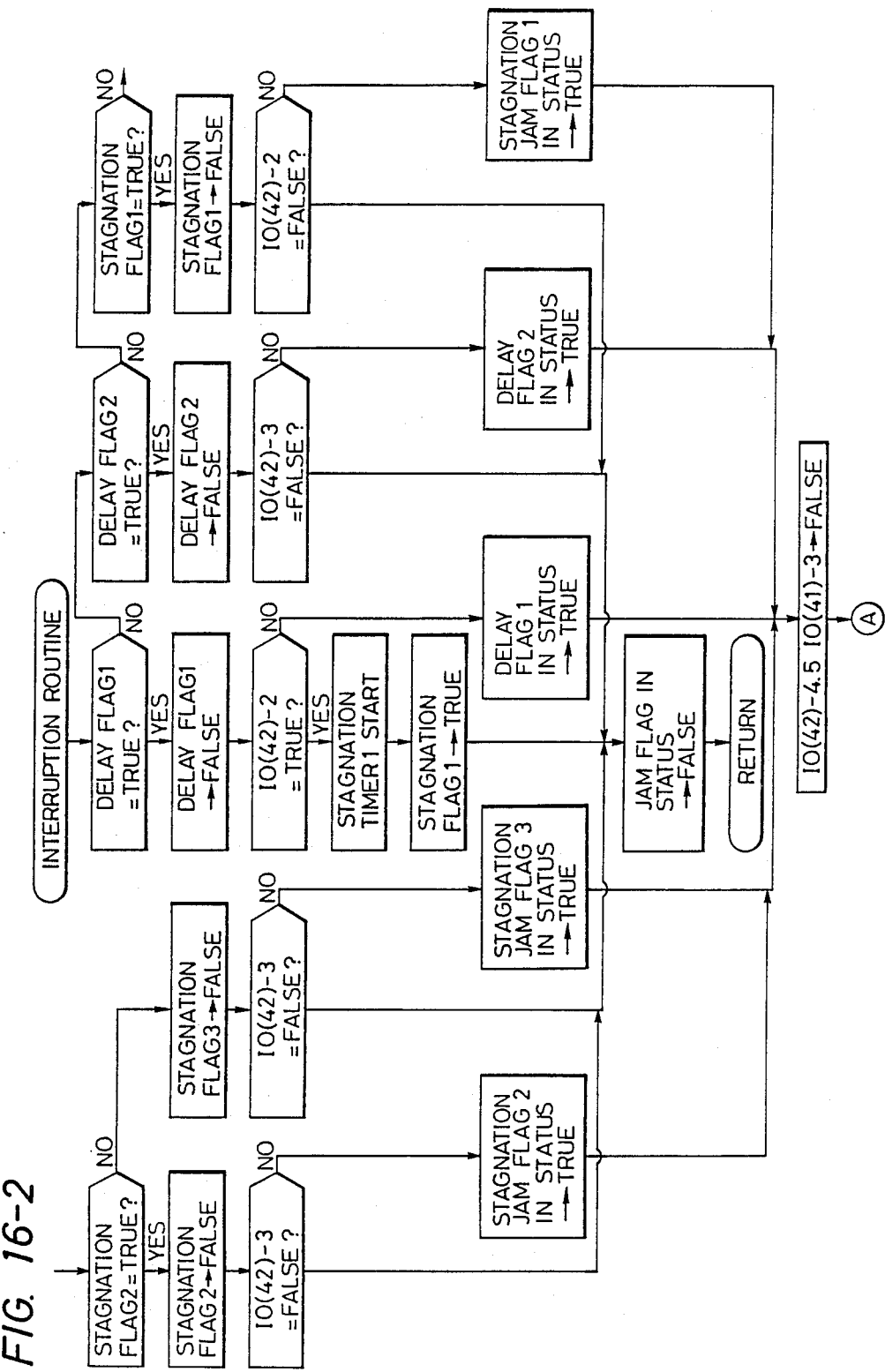

FIGS. 16-1 and 16-2 show flow charts of the above-described control program stored in a ROM 15-2. Also there is provided a RAM 15-3 for temporary storage of the status information etc.

Figure 17:
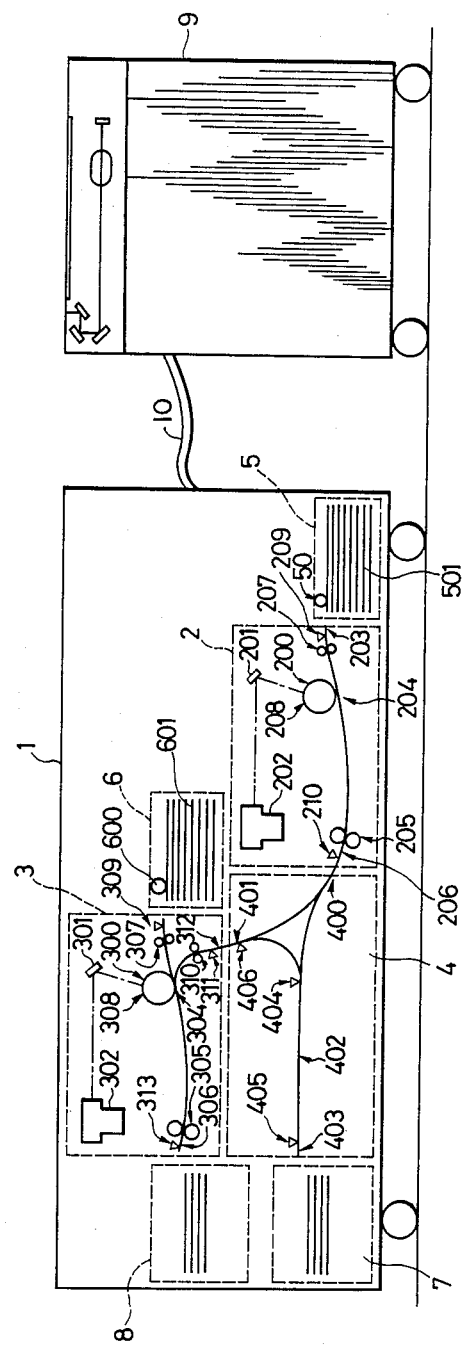
FIG. 17 is a schematic view showing the connection of said image recording apparatus with an original reading apparatus.

FIG. 17 shows the present image recording apparatus (hereinafter called printer) and an original reading apparatus 9 (hereinafter called reader) which are mutually connected through a cable 10 for transmitting the input and output signals of the I/O port IO(4) shown in FIG. 8.

Figure 18:
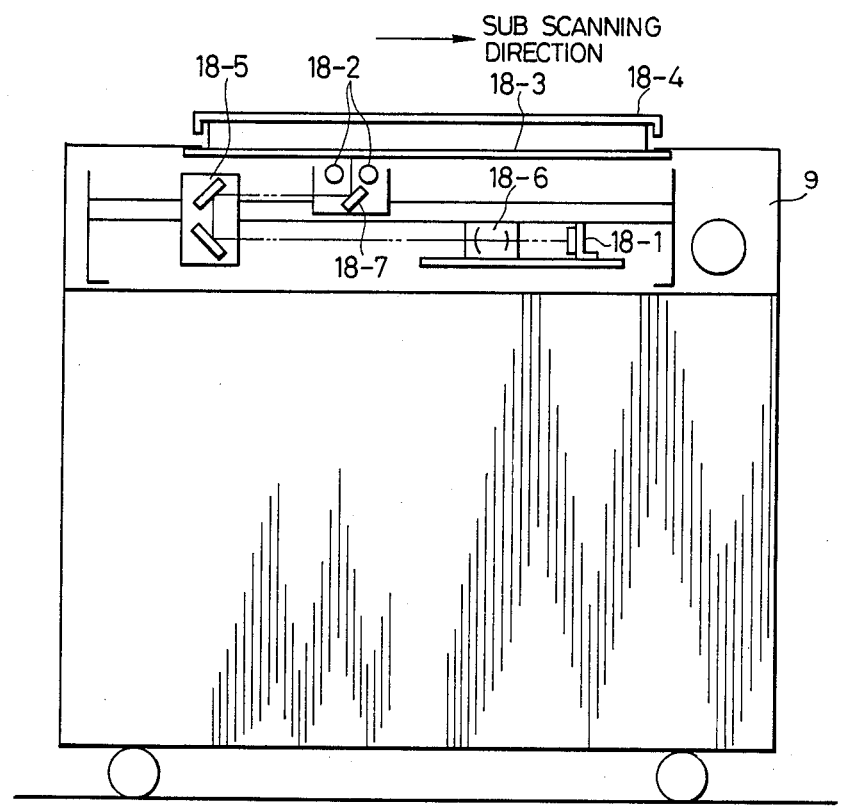
FIG. 18 is a cross-sectional view of said original reading apparatus.

FIG. 18 is a cross-sectional view of the reader shown in FIG. 17, wherein an original document is placed, with the lmage face downward, on an original supporting glass 18-3, at the farther left corner thereof, and is pressed against said glass by an original cover 18-4.

The original is illuminated by a fluorescent lamp 18-2, and an optical path is formed in such a manner that the reflected light from said original is focused on a charge-coupled device (CCD) 18-1 through mirrors 18-5, 18-7 and a lens 18-6, wherein said mirrors 18-7 and 18-5 are moved with a speed ratio of 2:1. The optical unit thus formed moves from left to right at a constant speed, by means of a DC servo motor under a phase locked loop control. The moving speed is 180 mm/sec. in the forward movement in which the original document is illuminated, and is 468 mm/sec. in the reverse movement. The resolving power in said auxiliary scanning movement is 16 lines/mm. The reader can read originals in a range from A5 size to A3 size, among which the sizes A5, B5 and A4 are placed with the shorter side facing the operator, and the sizes B4 and A3 are placed with the longer side facing the operator.

The optical unit can be reversed at three positions according to the size of the original. The first reversing position for the sizes A5, B5 and A4 is at 220 mm from the reference point of the original. The second reversing position for the size B4 is at 364 mm, and the third position for the size A3 is at 431.8 mm.

In the main scanning direction, the maximum scanning width is 297 mm corresponding to the longer side of A4 size placed as explained before. In order to resolve said width with a resolving power of 16 lines/mm, there are required $297 \times 16 = 4752$ bits in the CCD. Consequently, in the present reader there are employed two CCD's of 2628 bits each, driven in parallel. Thus, from the conditions of 16 lines/mm and 180 mm/sec., the main scanning period (=accumulating time of the CCD) is given by $T = 1/(v \times n) = 1/(180 \times 16) = 347.2$ $\mu$sec., and the transfer rate of the CCD is given by $f = N/T = 2628/347.2 = 7.569$ MHz.

Figure 19:
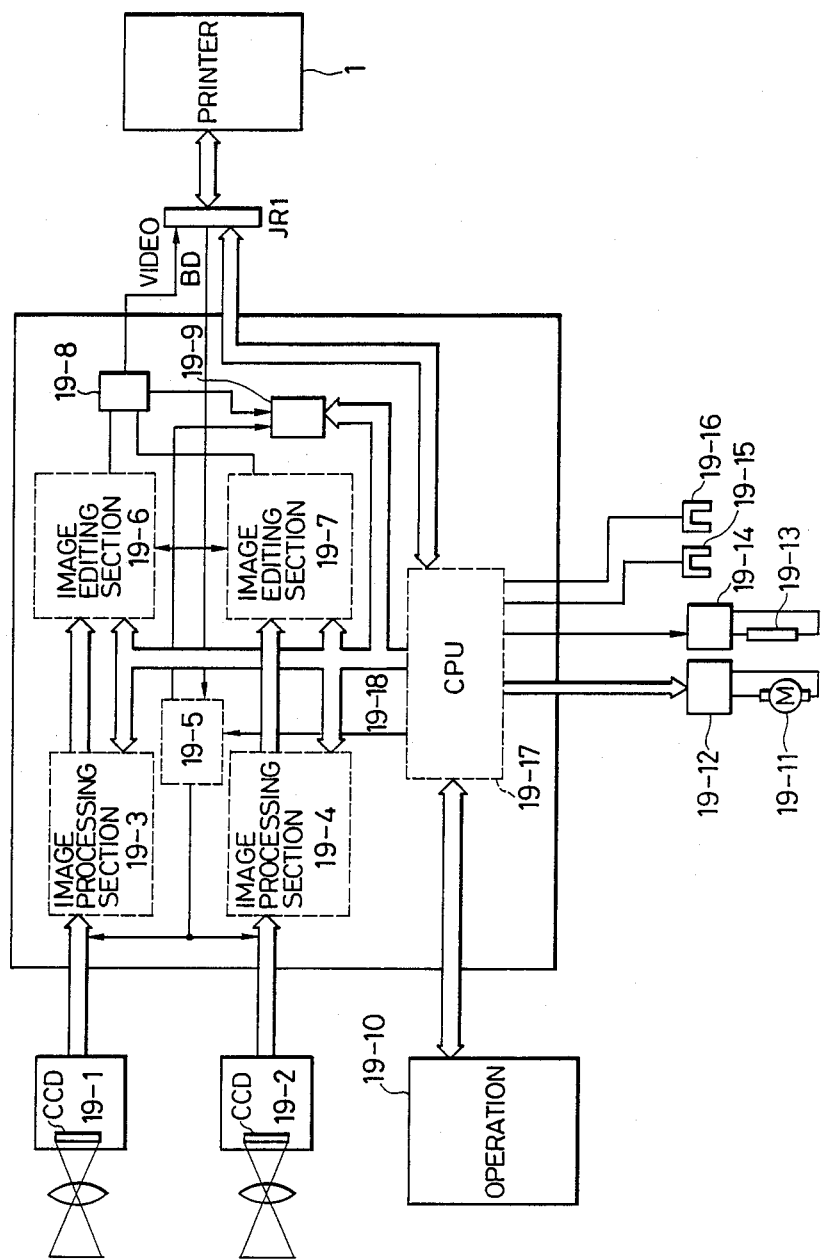
FIG. 19 is a block diagram showing a host controller, framed by solid lines, and related components in the original reading apparatus.

FIG. 19 is a block diagram of the reader unit, which is interfaced with the printer by a connector JR1 to be connected to the interface IO(4) shown in FIG. 8.

Each of CCD units 19-1, 19-2 is provided with a clock driver for CCD, an amplifier for the signals from the CCD, and an A/D converter for A/D conversion of said signals. Control signals to said CCD units 19-1, 19-2 are generated in a CCD control signal generator 19-5 and are supplied to the clock drivers of the CCD units 19-1, 19-2. Said control signals are generated in synchronism with the horizontal synchronization signal BD from the printer. The CCD units 19-1, 19-2 send image data in the form of 6-bit digital signals to image processing units 19-3, 19-4, each of which is provided with a sampling circuit for sampling the output signals of the CCD to control the light intensity of the light source through the CPU, a peak-hold circuit for detecting the peak value of the light intensity in each main scanning for achieving an automatic exposure control function, a circuit for detecting the shading of the light source and the lens, a correction circuit therefor, and a digitizing circuit for binary or trinary digitizing of the 6-bit image data after said correction according to the slice levels determined by a dither pattern or a peak-hold value in the immediately preceding line or in a line preceding said line. The image signals quantized in the image processing units 19-3, 19-4 are supplied to image editing tnits 19-6, 19-7, each of which is provided with a buffer memory of a capacity of 2 lines. The capacity of each line is selected larger than twice of the usual number of pixels (4752 pixels) in a line, in order to enable data storage at a doubled sampling rate in case the image is enlarged to a magnification of 200%. As explained above the buffer memory is divided into two parts in order to write the image data of a Y-th line into the first memory while reading the image data of (Y−1)th line from the second memory. To each buffer memory there is provided a write address counter for writing the image data into the buffer memory, a read address counter for data reading and an address selector circuit for selecting the address signals from said two counters. Said counters are of the parallel-load type with a presettable initial value, which is loaded by the CPU to the I/O port. More specifically, each time the auxiliary scanning reaches a line corresponding to the trimming coordinate, the CPU sets addresses corresponding to the main scanning coordinate in said counters according to the coordinate information instructed by an operation unit, thus enabling the editing of the original information. There are also provided a coordinate range control counter and a gate circuit therefor, in order to enable white masking, black masking, white frame trimming and black frame trimming. Further there is provided a shift register for automatic splicing of the CCD's.

In the following there will be explained the function of the above-described circuits.

The image data are at first released from the image editing unit 19-6 and then from 19-7, and a synthesizer unit 19-8 is provided for obtaining a continuous series of image data by smooth junction of said two series of image data. A discriminating unit 19-9 detects the coordinates of the position of the original in the preliminary original scanning during the pre-rotation of the printer after the copy start button is actuated. Said unit is provided with a shift register for detecting consecutive 8 bits representative of a white image, an I/O port, and counters for the main and subsidiary scannings. An operation unit 19-10 is provided with a key matrix, a liquid crystal display unit and liquid crystal driver. In FIG. 19 there are further shown a DC motor 19-11 for driving the optical unit; a driving circuit 19-12 therefor; a fluorescent lamp 19-13 for illuminating the original; a lighting unit 19-14 therefor; a photosensor 19-15 for detecting the presence of the optical unit at a home position; and a photosensor 19-16 for detecting the presence of the optical unit at a position for illuminating the front end of the original. A CPU unit 19-17 is composed of a CPU, a ROM, a RAM, a battery back-up circuit, a timer circuit and an I/O port. The CPU unit 19-17 is provided with an interface and with the operation unit 19-10, and performs sequence control of the reader and controls the printer by the commands according to the instructions from said operation unit. Also in response to instructions relating to the image processing, it performs data setting for various counters in the image processing units 19-3, 19-4 and image editing units 19-6, 19-7 prior to or in the course of the original scanning. Futhermore the CPU 19-17 controls the fluorescent lamp lighting unit 19-14 to regulate the light intensity prior to the original scanning according to the light intensity data from the image processing units, also presets the speed data for the DC motor driving circuit 19-12 according to the selected magnification, and calculates the amount of image data junction according to the data from the image editing units 19-6, 19-7.

In the following there will be explained the automatic original discriminating circuit in the discriminating unit 19-9 shown in FIG. 19.

Figure 20:
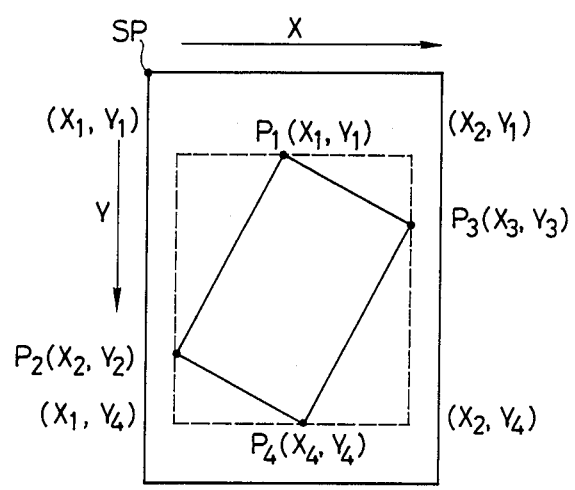
FIG. 20 is a view of an original placed on an original support, with a coordinate system.

FIG. 20 shows a state of the original placed on the original supporting glass 18-3. The placing position of the original is basically defined, but the original may also be placed in a skewed position as illustrated. In such case a preliminary scan of the optical unit in the course of the pre-rotation of the printer is utilized for determining the coordinates of four points (X1, Y1), (X2, Y2), (X3, Y3) and (X4, Y4) wherein X and Y respectively represent coordinates in the main and subsidiary scanning direction measured from a standard point SP on the original supporting glass 18-3. In this manner the size and position of the original are discriminated, for selecting the scan stroke in a multi-copying operation and the desired sheet cassette. The original cover 18-4 is formed such that black image data are always obtained from the area outside the original. The main and subsidiary scannings are so conducted as to cover the entire area of the original supporting glass, and the scanning for printing is conducted thereafter. The subsidiary scanning speed is larger than that in the scanning for printing.

Figure 21:
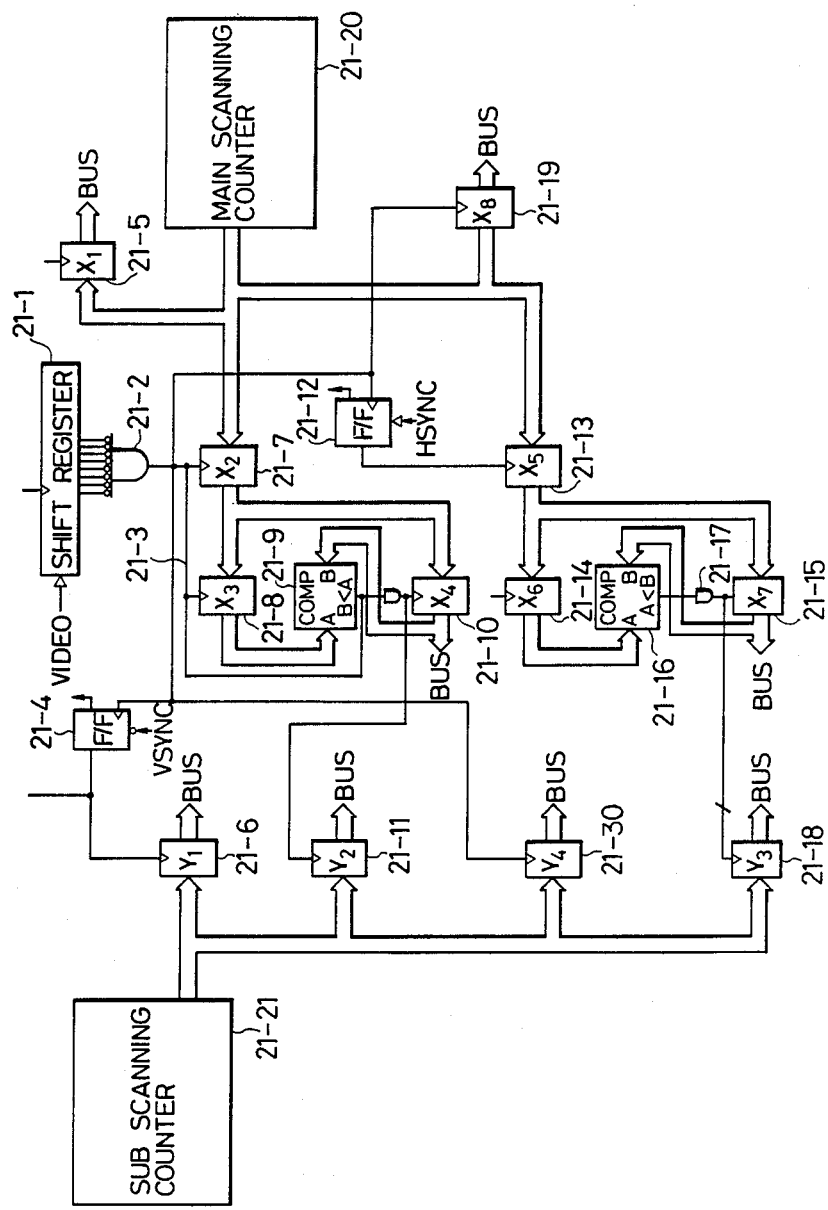
FIG. 21 is a block diagram showing the circuit of the original coordinate discriminating unit.

FIG. 21 is a block diagram of a circuit for the aforementioned coordinate detection. The image data VIDEO binary digitized in the preliminar scanning are supplied, in the unit of 8 bits, to a shift register 21-1. Upon entry of 8 bits, a gate circuit 21-2 checks whether 8 bits are all white, and, if so, releases a signal "1" to a signal line 21-3. After the start of original scanning, a flip-flop F/F 21-4 is set in response to the first 8-bit white signals. Said flip-flop is reset in advance by an image leading edge signal VSYNC, but remains in the set state until the next signal VSYNC. Upon setting of I5 the F/F 21-4, the value of a main scanning counter 21-20 is loaded in an X1-latch 21-5 as the coordinate value X1. Also the value of a subsidiary scanning counter 21-21 is loaded in a Y1-latch 21-6 as the coordinate value Y1. In this manner the coordinate P1 (X1, Y1) is determined.

Also each time the signal "1" is released to the signal line 21-3, the value of the main scanning is loaded in an X2-latch 21-7, and said value is immediately loaded in an X3-latch 21-8 before the entry of next 8 bits into the shift register 21-1. Upon loading of the value of the main scanning into the X3-latch 21-8 at the appearance of first 8-bit white signals, a comparator 21-9 compares said value with the data in an X4-latch 21-10 which is reset to "0" at the signal VSYNC. If the data of the X3-latch 21-8 are larger, said data which are equal to those in the X2-latch 21-7 are loaded in the X4-latch 21-10. At the same time the value of the subsidiary scanning counter is loaded in a Y2-latch 21-11, prior to the entry of the succeeding 8-bit signals into the shift register 21-1. The comparison of the value of the X3-latch 21-8 with that of the X4-latch 21-10 is conducted over the entire image area, whereby the X4-latch 21-10 retains the maximum value of the original area in the X-direction, while the Y2-latch 21-11 retains the corresponding coordinate in the Y-direction. In this manner the coordinate P2 (X2, Y2) is determined.

A flip-flop F/F 21-12 is set in response to the first 8-bit white signals in each main scanning line and remains in the set state until the horizontal synchronization signal HSYNC when it is reset. Upon setting of said F/F 21-12, the value of the main scanning counter is set in an X5-latch 21-13, and is loaded in an X6-latch 21-14 before the entry of the succeeding horizontal synchronization signal HSYNC. A comparator 21-16 compares said value with the value of an X7-latch 21-15 in which preset is the maximum value in the X-direction at the signal VSYNC. If the value of the X7-latch 21-15 is larger than the X6-latch 21-14, a signal 21-17 is activated to load the value of the X6-latch 21-14, which is equal to the X5-latch 21-13, in the X7-latch 21-15. Said loading operation is conducted in a period between two consecutive horizontal synchronization signals. The above-mentioned comparison is conducted over the entire image area, whereby the X7-latch 21-15 retains the minimum value of the coordinate of the original in the X-direction. Also the value of the subsidiary scanning is loaded in a Y3-latch 21-18 in response to the activation of the signal line 21-17. In this manner determined is the coordinate P3 (X3, Y3).

An X4-latch 21-10 and a Y4-latch 21-30 respectively store the values of the main and subsidiary scanning counters each time 8-bit white signals appear over the entire image area. Consequently, at the completion of the preliminary scanning of the original, these latches store the values of the counters when the 8-bit white signals appear last. In this manner determined is the coordinate P4 (X4, Y4).

In the following there will be explained the two-side copying function utilizing the reader and the printer.

Figure 22:
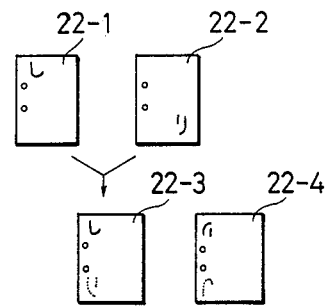
FIGS. 22, 23, 24, 25, 26 and 27 are views showing the scanning directions for an original on the original support and the copies obtainable corresponding to said scannings.

FIG. 22 shows preparation of a two-side copy 22-3 or 22-4 from two one-side originals 22-1, 22-2 placed side by side on the original supporting glass of the reader, with binding side at left wherein the image copied on the bottom side is represented by a dotted line.

Figure 23:
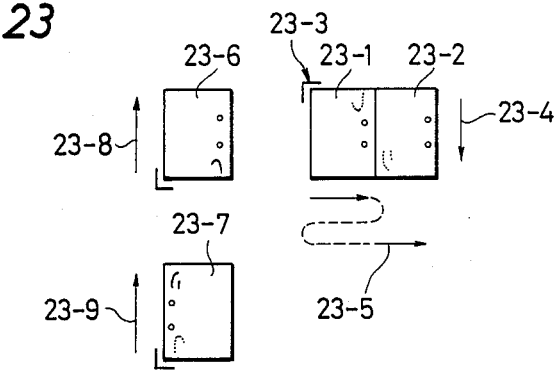

FIG. 23 shows the original 23-1 of page 1 placed at left, and the original 23-2 of page 2 placed at right. There are also shown the placing standard position 23-3 for the original; an arrow 23-4 indicating the main scanning direction of the reader; another arrow 23-5 indicating the subsidiary scanning direction, wherein dotted line indicates the reversing movement for the next image scanning. 23-6 and 23-7, respectively, indicate the records obtained in the first and second image recording units 2, 3 and 23-8 and 23-9 indicate the main scanning direction of the printer.

In order to obtain the copy 23-7 in the stacker 8 shown in FIG. 17, there is at first conducted a preliminary scanning in the reader to detect the area of the original, whereby the CPU 19-17 of the reader calculates the entire width and the half width in the subsidiary scanning direction. Then in the actual original scanning, the CPU 19-17 designates the DUPLEX MODE to the printer, and sends a print command to the first image recording unit 2 for image formation. Then, when the vertical synchronization request signal is fed back from the first image recording unit 2, the CPU 19-17 of the reader initiates the original scanning by sending a signal that the scanning direction is from left to right to the CCD control signal generator 19-5. Shortly after said initiation, the transmission of the video signal is started simultaneously with the sending, to the first image recording unit, of the vertical synchronization signal generated by the image front end signal. The transmission of said video signal is made in synchronism with the start of the vertical synchronization signal. The subsidiary scanning of the original stops in the middle ($\frac{1}{2}$) of the subsidiary scanning range, and the optical system is reversed to the home position. In the meantime the aforementioned image 23-6 is obtained from the first image recording unit 2.

This recording sheet is inverted in the SWITCH-BACK MODE in the sheet handling unit and supplied to the second image recording unit. In the meantime the reader confirms the active record switching signal from the sheet handling controller in the image recording unit, and monitors the vertical synchronization request signal from the second image recording unit. When said signal is confirmed, the reader starts the original scanning again, and, upon arrival at a coordinate corresponding to the middle of the subsidiary scanning range, the vertical synchronization signal is transmitted to the second image recording unit simultaneously with the transmission of the video signal. The optical system is reversed to the home position when the scanning reaches a predetermined point in the subsidiary scanning.

Through the above-described copying operation there is obtained the two-side copy 23-7 in the second stacker 8 shown in FIG. 17.

Figure 24:
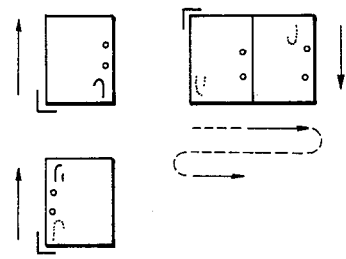

FIG. 24 shows a case in which pages 1 and 2 are, respectively, placed at right and left, opposite to the arrangement in FIG. 23. In this case the timings of image signal output in the subsidiary scanning need to be interchanged in comparison with the case shown in FIG. 23.

Figure 25:
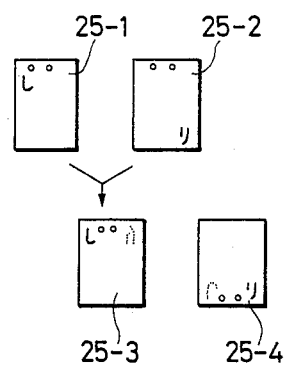

FIG. 25 shows a case of obtaining a two-side copy 25-3 or 25-4 from two one-side originals 25-1, 25-2 placed side by side on the original supporting glass of the reader, with the binding sides on top.

Figure 26:
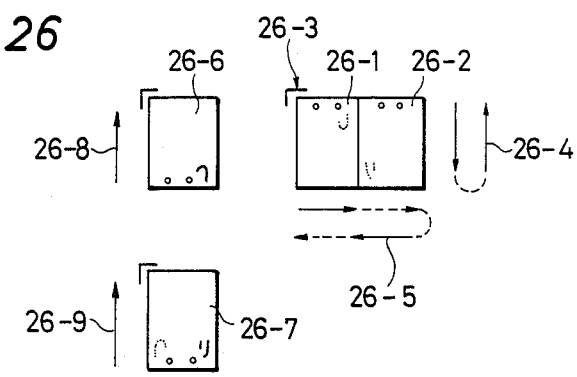

FIG. 26 shows an original 26-1 of page 1 placed at left, and another original 26-2 of page 2 placed at right. In order to obtain a copy 26-7 from such originals, the reader at first effects a preliminary scanning to detect the area of the original, whereby the CPU 19-17 calculates the entire width and the half width of the subsidiary scanning range. Then, in the actual original scanning, the CPU 19-17 designates the DUPLEX MODE to the printer, and sends the print command to the first image recording unit 2 for image formation. Then, when the vertical synchronization request signal is fed back from the first image recording unit 2, the CPU of the reader sends, to the CCD control signal generator 19-5, a signal that the main scanning should be made from the farther side to the closer side to the operator, thus initiating the original scanning. Shortly after said initiation, the transmission of the video signal is initiated simultaneously with the transmission, to the first image recording unit, of the vertical synchronization signal generated from the image front end signal. The original scanning is continued, and the transmission of the vertical synchronization signal and of the video signal is stopped when the scanning reaches a half of the predetermined subsidiary scanning range. The subsidiary scanning of the original is further continued and is stopped at a back home position (not shown) opposite to the placing standard position for the original. In the meantime, an image 26-6 is obtained when the sheet is discharged from the first image recording unit. Said sheet is inverted in the SWITCH-BACK mode in the sheet handling unit, and is supplied to the second image recording unit. On the other hand, the reader confirms the activation of the record switching signal from the image recording units, and monitors the vertical synchronization request signal. After said signal is confirmed, the CPU in the reader sends, to the CCD control signal generator 19-5, a signal that the main scanning should be effected from the closer side to the farther side from the operator, then convert the predetermined entire and half widths of the subsidiary scanning range into coordinate values from the aforementioned back home position, and starts the scanning operation from said back home position toward the home position. The transmission of the video signal is terminated when the scanning reaches a coordinate value corresponding to the half scanning width. The subsidiary scanning operation is still continued and is stopped when the optical system reaches the home position.

Through the above-described operation, there is obtained a two-side copy 26-7 in the second stacker 8 shown in FIG. 17.

Figure 27:
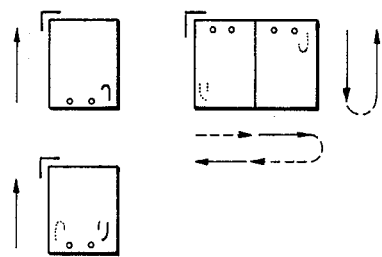
Figure 28:
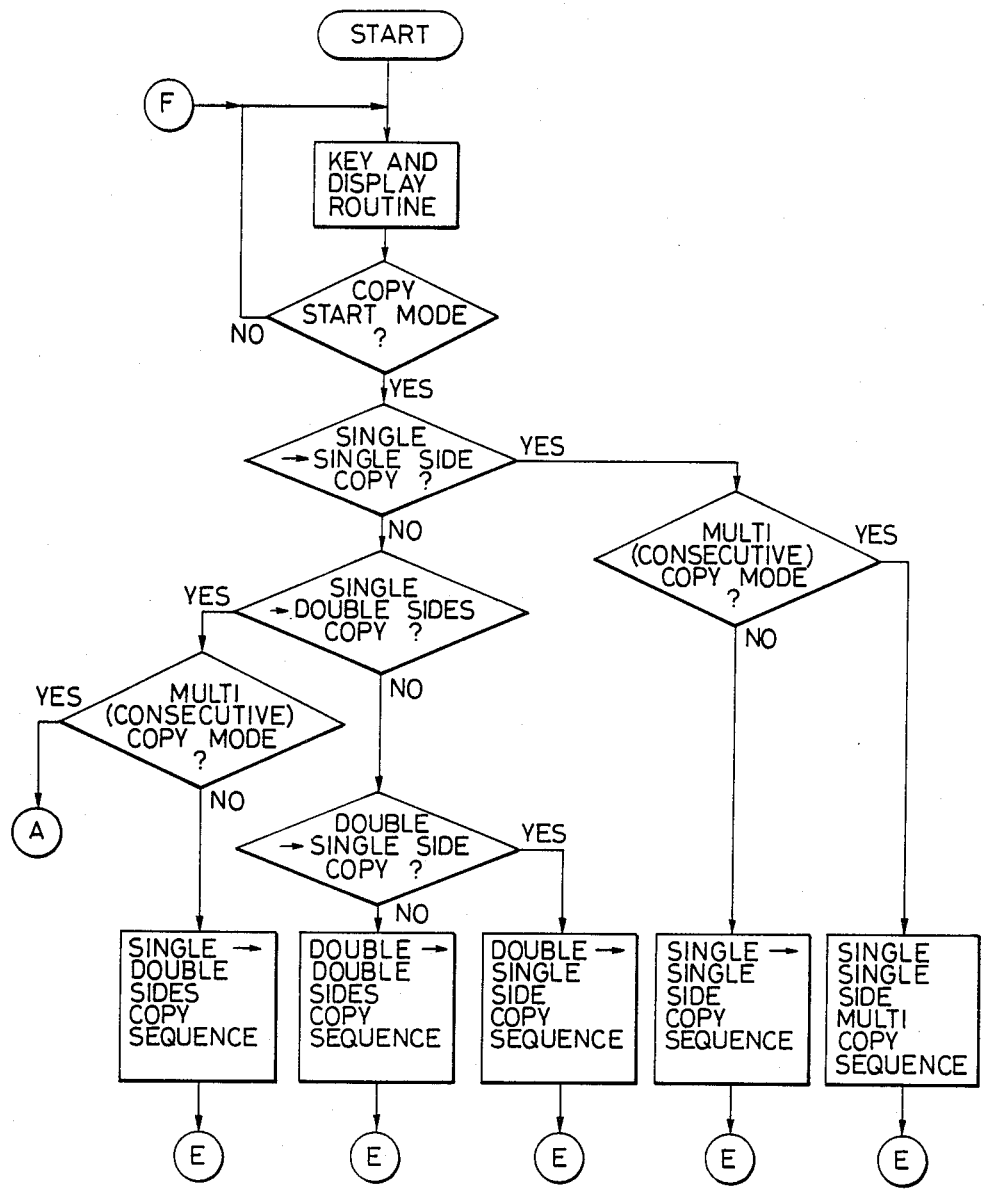
FIGS. 28, 29, 29A, and 29B to 38 are flow charts for obtaining two-side copies shown in FIGS. 23 to 27.
Figures 29, 29A:
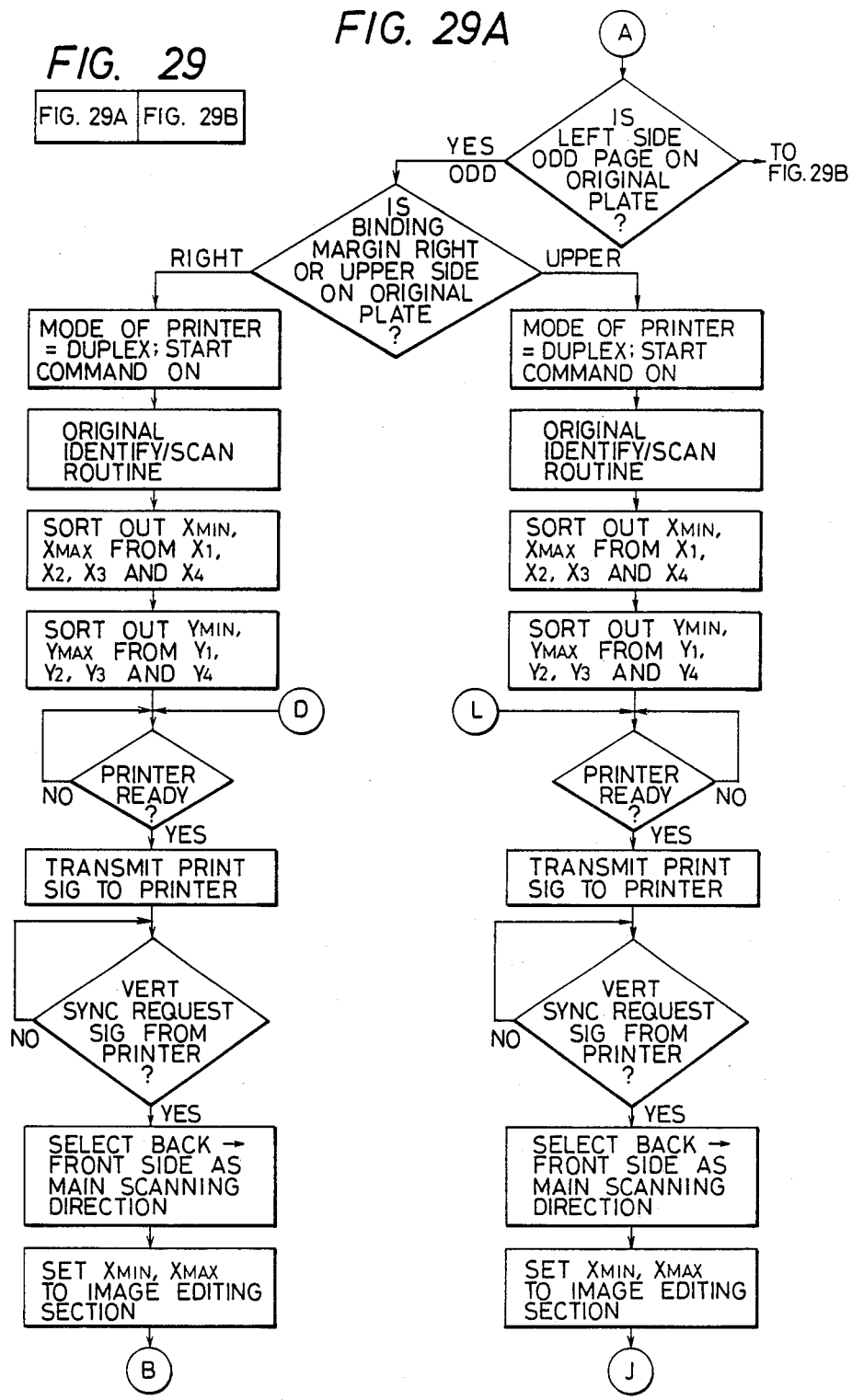
Figure 29B:
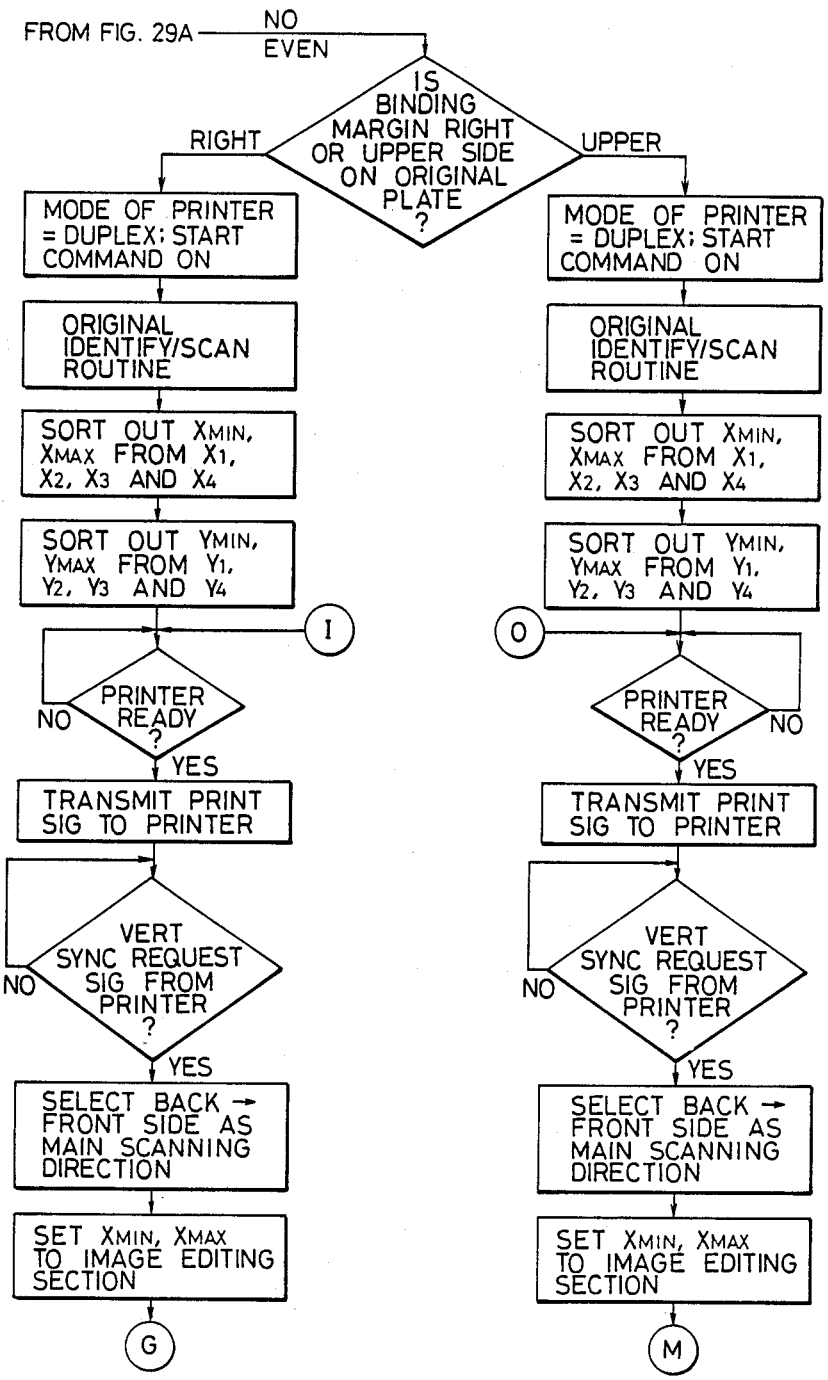
Figure 30:
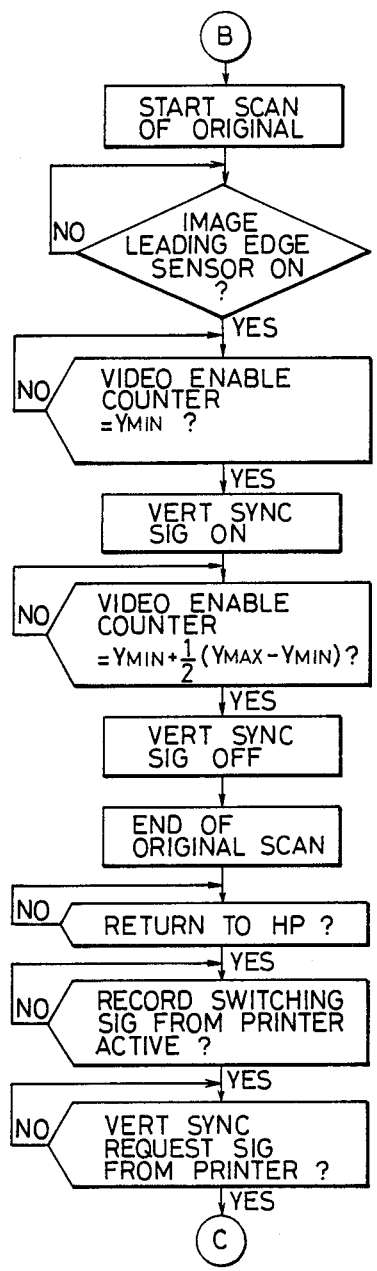
Figure 31:
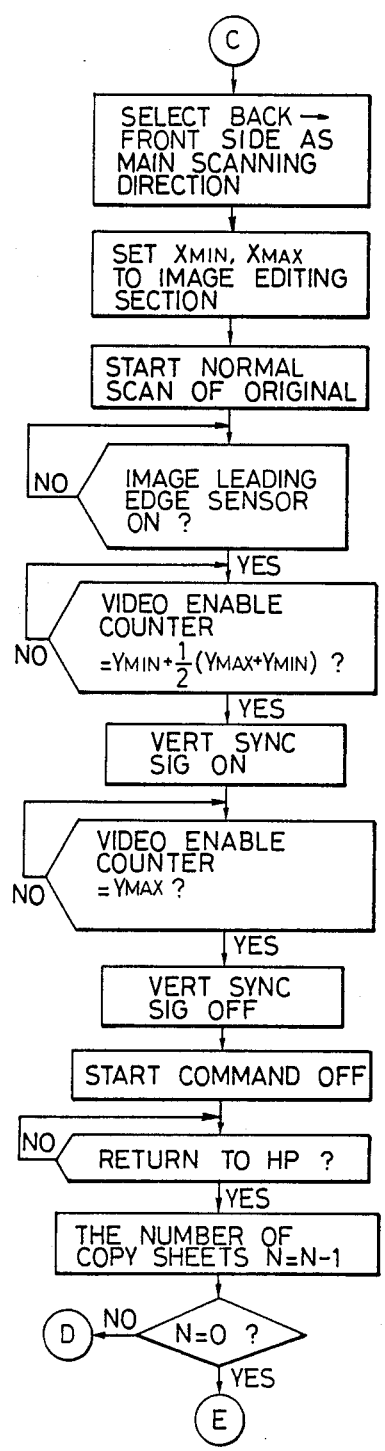
Figure 32:
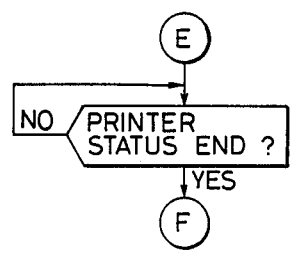
Figure 33:
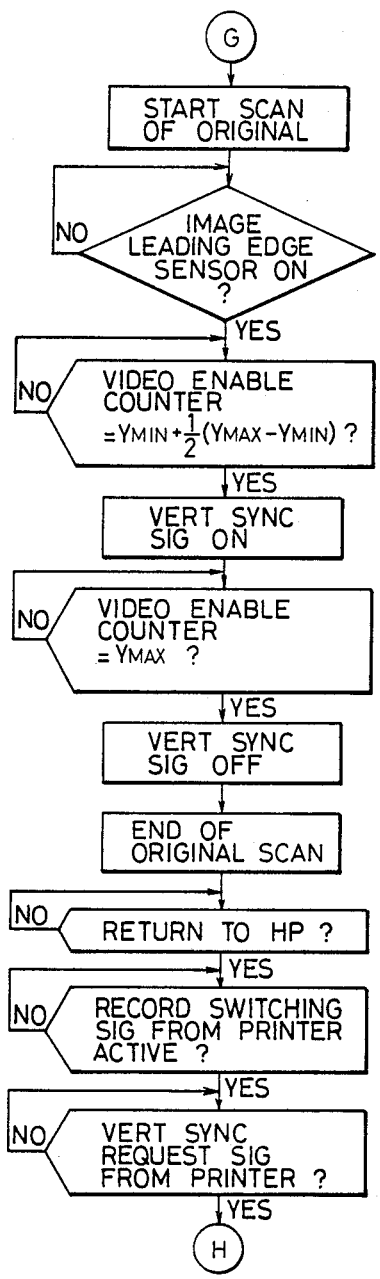
Figure 34:
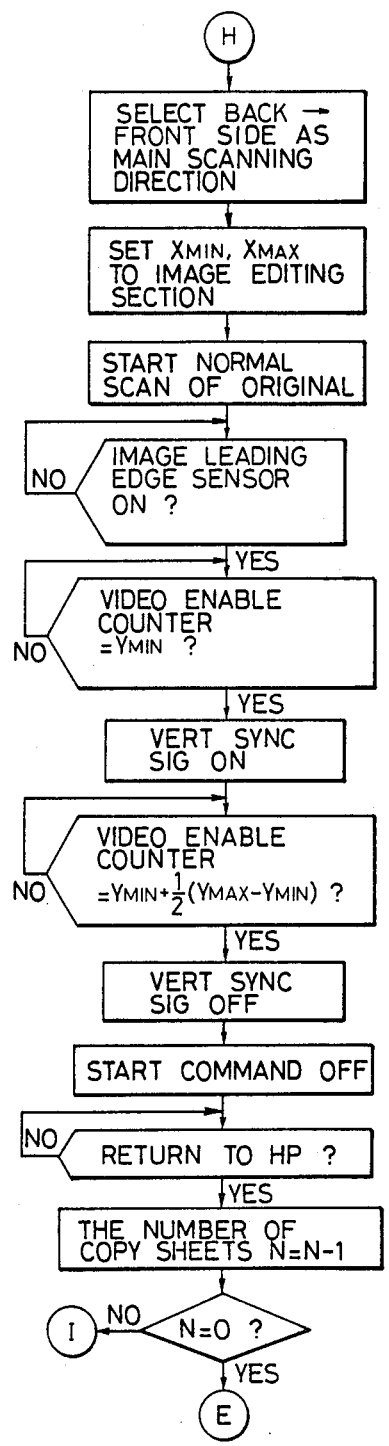
Figure 35:
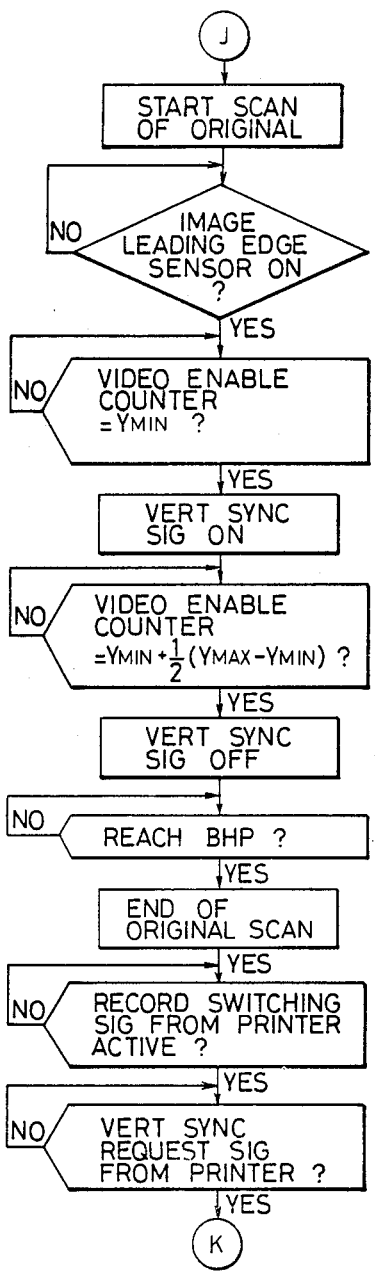
Figure 36:
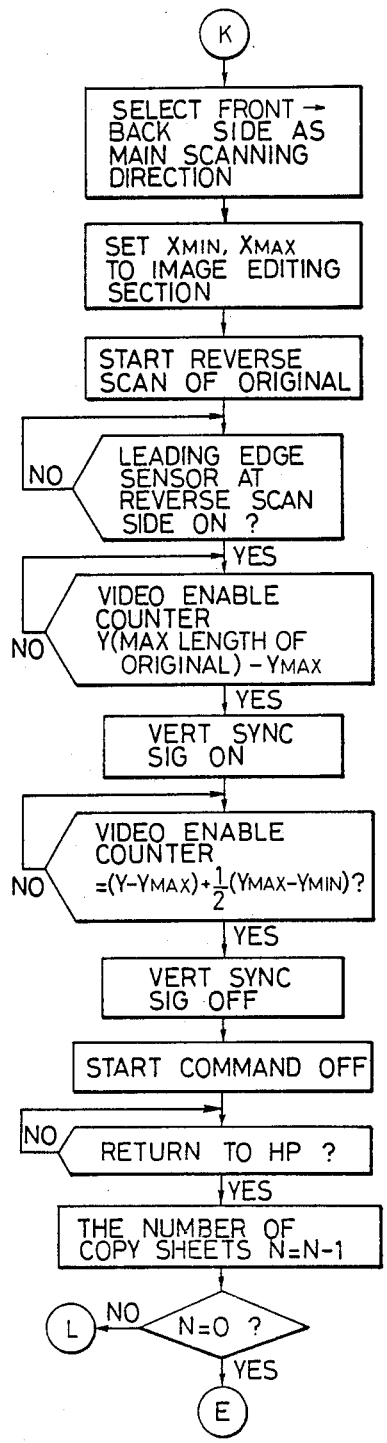
Figure 37:
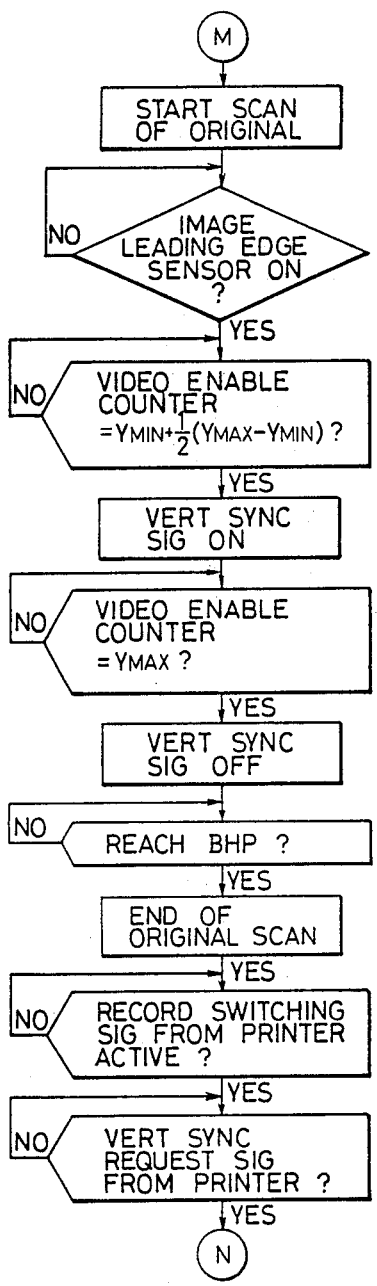
Figure 38:
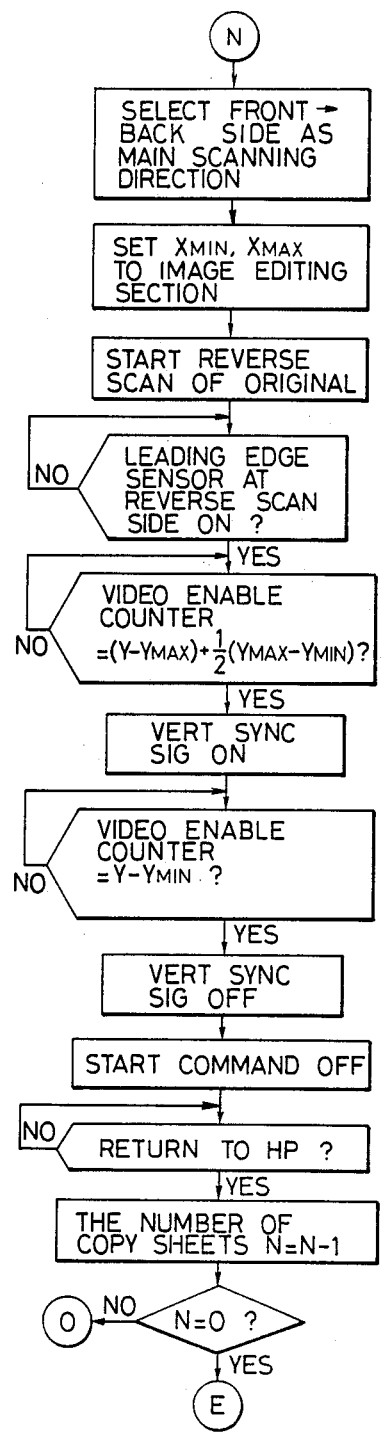

FIG. 27 shows a case in which the originals at left and right are interchanged in comparison with the case shown in FIG. 26. In such case the timings of the image signal output need to be interchanged in comparison with the case shown in FIG. 26.

FIGS. 28 to 38 show control flow charts for obtaining two-side copy as shown in FIGS. 23 to 27, and the corresponding control programs are stored in a ROM in the CPU 19-17.

In the present embodiment, the position of the binding side of the original on the original supporting glass, and the page arrangement of the originals on said glass are entered through the keyboard. It is however possible to automatically identify the position of the binding side through the detection of filing holes. In the foregoing description it is assumed that the binding side is positioned on top or at left of the original, but the present invention is similarly applicable in case the binding side is positioned at bottom or at right.

As explained in the detail above, in the present invention there are provided plural image forming units which are effectively connected through a sheet handling unit, and controllers for said units which are controlled by a master controller thereby achieving the high-speed, two-side and multiplex image recording modes. Also various recording modes are rendered possible by selecting the horizontal synchronization signals from said recording units according to the recording modes.

Also the original reading apparatus comprising the image editing unit and the operation unit is further provided with a function for detecting the coordinates of the original, thereby achieving high-speed, two-side and multiple copying and image editing according to the position of the originals and of the binding side thereof in an effective manner.

It is to be understood that the present invention is by no means limited to the foregoing embodiment but is subject to various variations and modifications within the scope and spirit of the appended claims. Particularly the image recording unit need not be limited to the electrophotographic recording apparatus employing a laser beam as described in the foregoing embodiment but can be replaced by various recording devices such as an ink jet printer or a thermal transfer printer.

What is claimed is:

1. An image recording apparatus responsive to external inputs thereto, said apparatus comprising:
   first and second image recording units for respectively recording images on a recording medium, each of said first and second recording units including means for generating a horizontal synchronization signal;
   a transport unit for transporting said recording medium between said first and second image recording units;
   first and second control units for controlling said first and second image recording units;
   a third control unit for controlling said transport unit; and
   a master control unit for controlling said first, second and third control units according to the external inputs to said apparatus, said master control unit including means for selecting one of said horizontal synchronization signals generated by one of said generating means included in said first and second recording units in response to an external input for selection of said recording units.

2. An image recording apparatus according to claim 1, wherein said transport unit is operable both in one operation mode in which the recording medium from said first image recording unit is transported, after inversion, to said second image recording unit, and in another operation mode in which the recording medium from said first image recording unit is transported, without inversion, to said second image recording unit.

3. An image recording apparatus according to claim 1, wherein said master control unit includes means for generating a vertical synchronization signal indicating the timing of transmission of image data to be recorded and for selectively sending said vertical synchronization signal to said first and second control units.

4. An image recording apparatus according to claim 1, wherein said master control unit includes means for selectively sending the image data to be recorded to said first and second control units.

5. An image recording apparatus according to claim 1, wherein said first and second image recording units comprise laser beam printers ech of which comprises a photosensitive drum and a laser scanner for scanning said photosensitive drum.

6. An image recording apparatus according to claim 5, wherein said laser beam printer includes means for detecting the scanning position of the laser beam in order to generate the horizontal synchronization signal.

7. An image copying apparatus comprising:
   first and second image recording units for respectively recording images on recording media;
   a transport unit for transporting said recording media between said first and second image recording units;
   a platen for receiving a pair of originals thereon;
   reading means for reading images of the originals on said platen in main and subsidiary scanning directions to obtain electric image signals representing the images;
   supply means for supplying the image signals representing the images read from the pair of originals to said first and second image recording units; and
   control means for reversing the order of the image signals read out along respective main scanning directions of the pair of originals when a binding margin portion is provided at an edge of each original along the main scanning direction.

8. An image copying apparatus according to claim 7, wherein said transport unit includes means for transporting the recording medium from said first image recording unit, after inversion, to said second image recording unit.

9. An image copying apparatus according to claim 7, wherein said first and second image recording units comprise laser beam printers each of which comprises a photosensitive drum and a laser scanner for scanning said photosensitive drum.

10. An image copying apparatus according to claim 7, further comprising means for detecting the area of the original in accordance with the output of said reading means, wherein said control means includes means for controlling the reading area of said reading means in accordance with the detection output of said detecting means.

11. An image copying apparatus comprising:
a platen for receiving a pair of originals thereon;
reading means for reading the images of the originals on said platen in main and subsidiary scanning directions to obtain electric image signals representing the images of the originals;
first and second image recording units for recording, respectively, on the top face and bottom face of a recording medium, the output image signals from said reading means and representing the images of the originals; and
control means for changing the order in which the originals are read by said reading means in accordance with the order in which the originals are arranged on said platen in the subsidiary scanning direction.

12. An image copying apparatus according to claim 11, further comprising transport means for transporting the recording medium from said first image recording unit, after inversion, to said second image recording unit.

13. An image copying apparatus according to claim 11, further comprising detecting means for detecting the area of an original in accordance with the output of said reading means.

14. An image copying apparatus according to claim 13, wherein said control means includes means for controlling the reading area of said reading means in accordance with the detection output of said detecting means.

15. An image copying apparatus according to claim 14, wherein said detecting means functions before said reading means releases image signals representing images to be recorded by said first image recording unit.

16. An image copying apparatus according to claim 11, wherein said first and second image recording units comprise laser beam printers each of which comprises a photosensitive drum and a laser scanner for scanning said photosensitive drum.

17. A copying apparatus for forming an image on a recording medium, comprising:
a copy board for placing an original thereon, said copy board being divided into a first region and a second region;
scanning means for scanning the first and second regions;
image forming means for independently forming an image;
controlling means for selectively setting a first scan mode and a second scan mode, such that in the first scan mode said scanning means is operated to scan the two regions in the same direction, and in the second scan mode said scanning means is operated to scan the two regions in directions respectively different from each other.

18. An apparatus according to claim 17, wherein in said first scan mode said image forming means records the images of said first and second regions in the same direction respectively on fron and back surfaces of the recording medium, and in said second scan mode said image forming means records the images of said first and second regions in the directions respectively different from each other on the front and back surfaces of the recording medium, respectively.

19. A copying apparatus for forming an image on a recording medium, comprising:
image generating means for generating first and second images respectively different from each other;
recording means for respectively recording images corresponding to said first and second images on opposite surfaces of the recording medium, said opposite surfaces being the front and back surfaces thereof,
wherein said recording means being adapted to operate in first and second modes, such that in said first mode said recording means records said first and second images in the same direction on front and back surfaces of the recording medium, and in said second mode said recording means records said first and second images in directions respectively different from each other on the front and back surfaces of the recording medium, respectively, and
further comprising controlling means for controlling an image generating direction of said image generating means in accordance with said first and second modes.

20. A copying apparatus according to claim 19, wherein said imagae generating means comprises reading means for reading an original image.

21. A copying apparatus according to claim 19, wherein said image generating means comprises a platen, said platen having two regions on which first and second original documents are respectively placed.

22. A copying apparatus according to claim 19, wherein said first and second modes are selected in accordance with a position of binding margin of the original document.

23. An apparatus according to claim 20, wherein said recording means comprises a first recording unit for recording on the front surface of the recording medium and a second recording unit for recording on the back surface of the medium.

24. An apparatus according to claim 17, wherein said image forming means comprises a first recording unit for recording on the first side of the recording medium and a second recording unit for recording on the second side of the recording medium.

* * * * *

UNITED STATES PATENT AND TRADEMARK OFFICE
CERTIFICATE OF CORRECTION

PATENT NO. : 4,745,490
DATED : May 17, 1988
INVENTOR(S) : K. Shimizu, et al.

It is certified that error appears in the above-identified patent and that said Letters Patent is hereby corrected as shown below:

COLUMN 1

Line 48, "increase" should read --increases--.

COLUMN 6

Line 49, "signal S2" should read --signals S2--.

COLUMN 7

Line 12, "unit 3" should read --unit 3;--;
    Line 14, "in" should be deleted; and
    Line 60, "form" should read --from--.

COLUMN 9

Line 60, "described" should be deleted.

COLUMN 10

Line 9, "ROM11-2" should read --ROM 11-2--.
    Line 18, "respectively ports" should read --respectively to ports--.
    Line 32, "sheet sensor (3)" should read --sheet sensor (3) 311--.
    Line 38-9, "sheet sensor (3)" should read --sheet sensor (3) 311--.
    Line 41, "sheet sensor (3)" should read --sheet sensor (3) 311--.

UNITED STATES PATENT AND TRADEMARK OFFICE
CERTIFICATE OF CORRECTION

PATENT NO. : 4,745,490

DATED : May 17, 1988

INVENTOR(S) : K. Shimizu, et al.

It is certified that error appears in the above-identified patent and that said Letters Patent is hereby corrected as shown below:

COLUMN 11

Line 23, "AND" should read --and--.
Line 63, "lmage" should read --image--.

COLUMN 12

Line 5, "phase locked" should read --phase-locked--.
Line 60, "tnits" should read --units--.

COLUMN 14

LIne 19, "preliminar" should rad --preliminary--.
Line 28, "I5" should be deleted.

COLUMN 15

Line 65, "the image" should read
--the first image--.

COLUMN 16

Line 29, "ning,the" should read --ning, the--.
Line 61, "convert" should read --converts--.

UNITED STATES PATENT AND TRADEMARK OFFICE
CERTIFICATE OF CORRECTION

PATENT NO. : 4,745,490

DATED : May 17, 1988

INVENTOR(S) : K. Shimizu, et al.

It is certified that error appears in the above-identified patent and that said Letters Patent is hereby corrected as shown below:

COLUMN 17

Line 25, "the detail" should read --detail--.

COLUMN 18

Line 26, "ech" should read --each--.

COLUMN 20

Line 6, "fron" should read --front--.
    Line 36, "imagne" should read --image--.
    Line 50, "the medium." should read --the recording medium--.

Signed and Sealed this

Twenty-eighth Day of March, 1989

Attest:

Attesting Officer

DONALD J. QUIGG

Commissioner of Patents and Trademarks